United States Patent
Miyake et al.

(10) Patent No.: US 11,383,286 B2
(45) Date of Patent: Jul. 12, 2022

(54) METAL SHEET FOR PRESS FORMING, PRESS FORMING DEVICE, AND PRODUCTION METHOD FOR PRESSED COMPONENT

(71) Applicant: JFE STEEL CORPORATION, Tokyo (JP)

(72) Inventors: Hiroto Miyake, Tokyo (JP); Toyohisa Shinmiya, Tokyo (JP); Yuji Yamasaki, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 2 days.

(21) Appl. No.: 16/970,467

(22) PCT Filed: Feb. 21, 2019

(86) PCT No.: PCT/JP2019/006551
§ 371 (c)(1),
(2) Date: Aug. 17, 2020

(87) PCT Pub. No.: WO2019/167791
PCT Pub. Date: Sep. 6, 2019

(65) Prior Publication Data
US 2021/0114075 A1 Apr. 22, 2021

(30) Foreign Application Priority Data
Feb. 28, 2018 (JP) .............................. JP2018-034569

(51) Int. Cl.
*B62D 21/03* (2006.01)
*B21D 22/26* (2006.01)
(Continued)

(52) U.S. Cl.
CPC ............... *B21D 22/26* (2013.01); *B21D 5/01* (2013.01); *B21D 19/08* (2013.01); *B21D 22/02* (2013.01);
(Continued)

(58) Field of Classification Search
CPC ........ B62D 21/03; B62D 21/04; B62D 21/02; B61D 22/26
(Continued)

(56) References Cited

U.S. PATENT DOCUMENTS 7,306,281 B2 * 12/2007 Kobayashi ............. B60N 2/015
296/204
9,211,913 B2 * 12/2015 Ohta ...................... C21D 9/085
(Continued)

FOREIGN PATENT DOCUMENTS

| CN | 104918725 A | 9/2015 |
| CN | 105324192 A | 2/2016 |

(Continued)

OTHER PUBLICATIONS

Mar. 12, 2021 Search Report issued in European Patent Application No. 19761706.1.
(Continued)

*Primary Examiner* — Joseph D. Pape
(74) *Attorney, Agent, or Firm* — Oliff PLC

(57) ABSTRACT

A metal sheet for press forming has a shape such that a boundary position between the region corresponding to the curved portion and an other region in the region corresponding to a curved portion is rotationally displaced in-plane around a rotational center set at a position on a curved recessed side rather than a position corresponding to a ridge line between a top sheet portion and a vertical wall portion on the curved recessed side, in a direction in which a line length of an outer edge of a position to be formed into the
(Continued)

flange portion on a curved protruding side in the region corresponding to a curved portion approaches a line length of an outer edge of the flange portion on the curved protruding side in the press-formed component shape.

20 Claims, 19 Drawing Sheets

(51) Int. Cl.
  *B21D 5/01*  (2006.01)
  *B21D 19/08*  (2006.01)
  *B21D 22/02*  (2006.01)
  *B21D 24/00*  (2006.01)
  *B21D 37/08*  (2006.01)
  *B62D 21/04*  (2006.01)

(52) U.S. Cl.
  CPC ........... *B21D 24/005* (2013.01); *B21D 37/08* (2013.01); *B62D 21/03* (2013.01); *B62D 21/04* (2013.01); *Y10T 428/12236* (2015.01); *Y10T 428/12264* (2015.01)

(58) Field of Classification Search
  USPC ........................................................ 296/204
  See application file for complete search history.

(56) References Cited

U.S. PATENT DOCUMENTS

| | | | |
|---|---|---|---|
| 2004/0183340 A1* | 9/2004 | Tomita | B62D 25/2018 296/204 |
| 2015/0145284 A1* | 5/2015 | Nishida | B62D 25/145 296/187.1 |
| 2015/0367397 A1 | 12/2015 | Uchiyama et al. | |
| 2016/0082495 A1 | 3/2016 | Miyagi et al. | |
| 2016/0114379 A1 | 4/2016 | Nishimura et al. | |
| 2016/0243603 A1 | 8/2016 | Shinmiya et al. | |
| 2017/0266706 A1 | 9/2017 | Ito et al. | |
| 2017/0333972 A1 | 11/2017 | Nishimura et al. | |
| 2018/0021831 A1 | 1/2018 | Ageba et al. | |
| 2018/0065164 A1 | 3/2018 | Sumikawa et al. | |
| 2018/0085811 A1 | 3/2018 | Fujii et al. | |
| 2018/0126433 A1 | 5/2018 | Ogawa et al. | |
| 2018/0185899 A1 | 7/2018 | Saito et al. | |
| 2018/0208250 A1* | 7/2018 | Sasakura | B62D 25/2018 |
| 2019/0111463 A1 | 4/2019 | Natori et al. | |

FOREIGN PATENT DOCUMENTS

| | | | | |
|---|---|---|---|---|
| CN | 105492136 | A | 4/2016 | |
| CN | 106714997 | A | 5/2017 | |
| CN | 107148320 | A | 9/2017 | |
| CN | 107427884 | A | 12/2017 | |
| CN | 107530751 | A | 1/2018 | |
| JP | 2008-200709 | A | 9/2008 | |
| JP | 2010-64138 | A | 3/2010 | |
| JP | 4920649 | B2 | 4/2012 | |
| JP | 5031702 | B2 | 9/2012 | |
| JP | 5031703 | B2 | 9/2012 | |
| JP | 5217928 | B2 | 6/2013 | |
| JP | 2015131306 | A * | 7/2015 | ............. B21D 22/26 |
| JP | 6119848 | B2 | 4/2017 | |
| JP | 2017-170484 | A | 9/2017 | |
| WO | 2016/132905 | A1 | 8/2016 | |
| WO | 2016/136612 | A1 | 9/2016 | |
| WO | 2016/157976 | A1 | 10/2016 | |
| WO | 2017/006793 | A1 | 1/2017 | |
| WO | 2017/175730 | A1 | 10/2017 | |

OTHER PUBLICATIONS

Nov. 4, 2021 Office Action issued in Chinese Patent Application No. 201980013220.9.

May 21, 2019 International Search Report issued in International Patent Application No. PCT/JP2019/006551.

Sep. 1, 2020 International Preliminary Report on Patentability issued in International Patent Application No. PCT/JP2019/006551.

Aug. 9, 2019 Office Action issued in Japanese Patent Application No. 2019-530230.

* cited by examiner

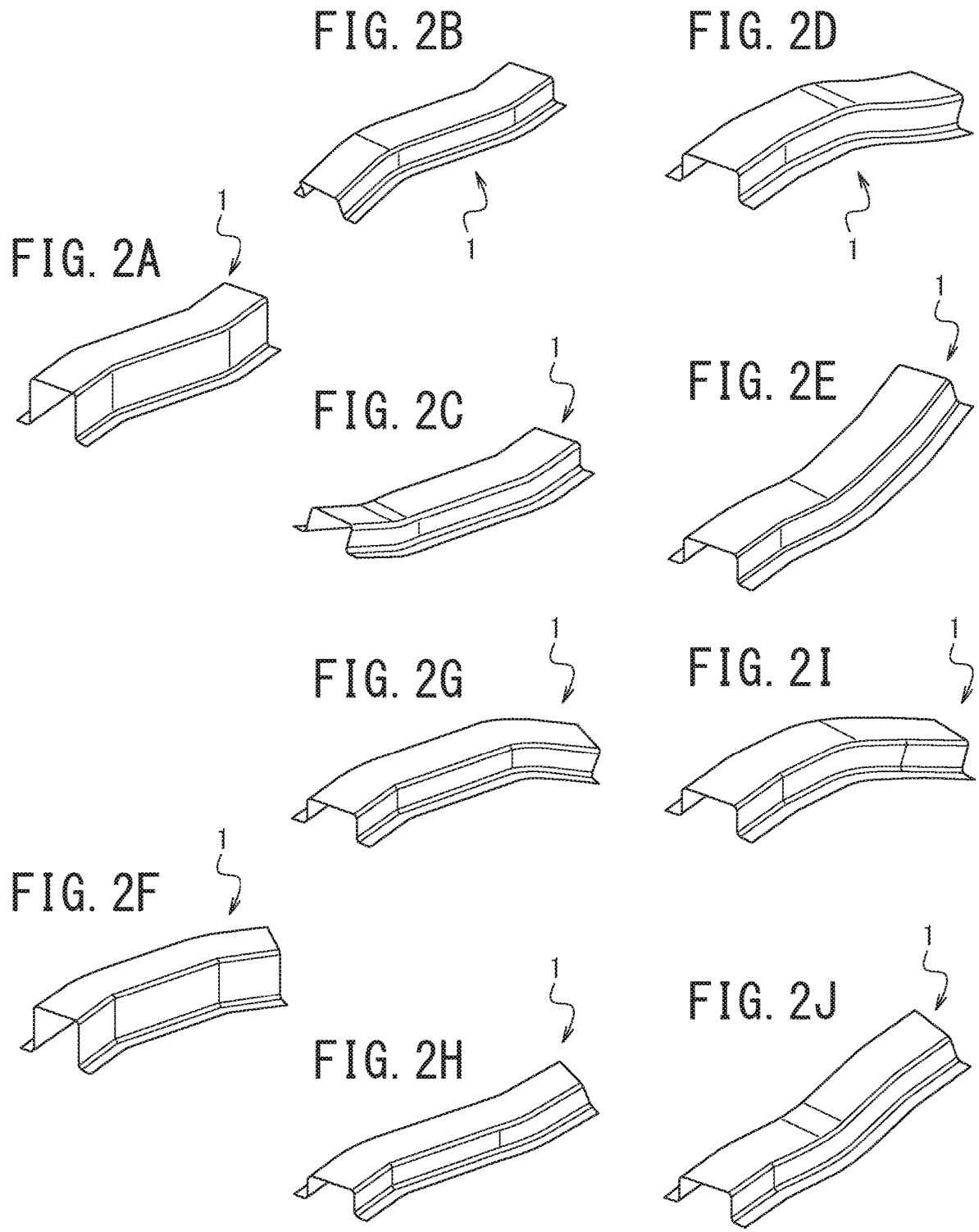

FIG.10A 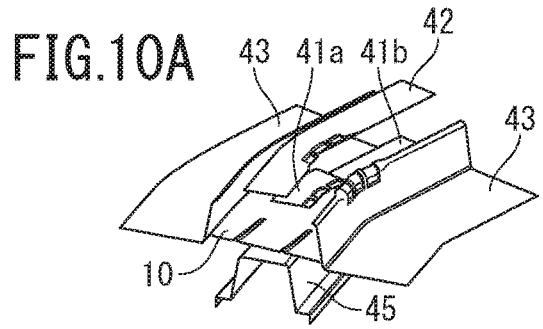 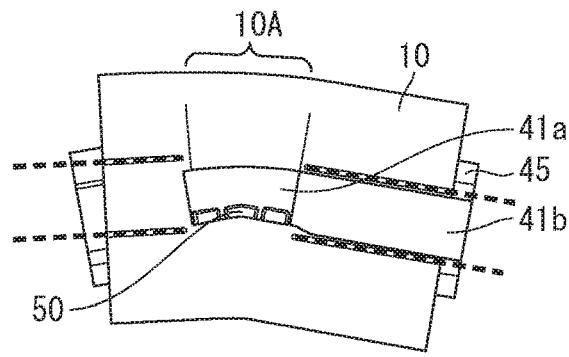
FIG.10B 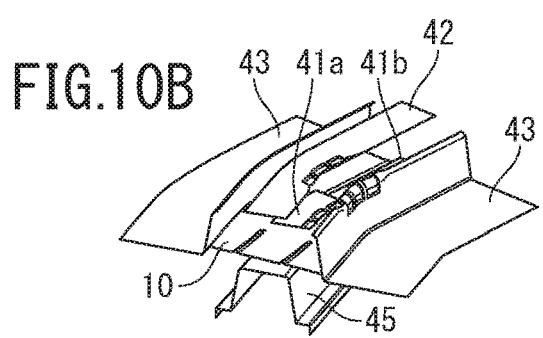 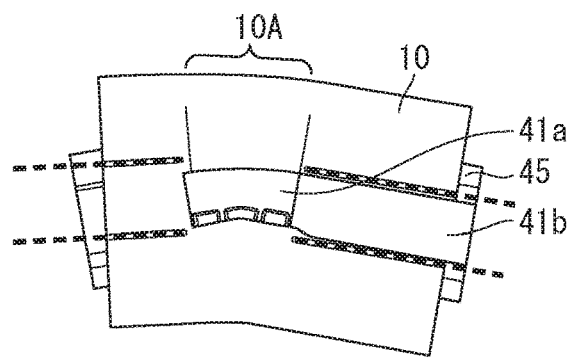
FIG.10C 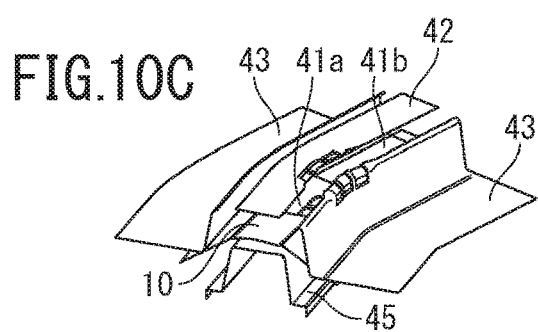 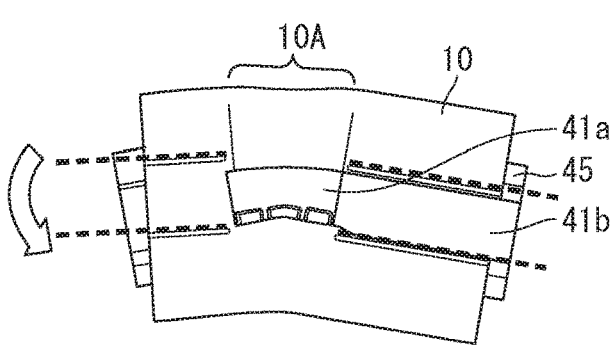
FIG.10D 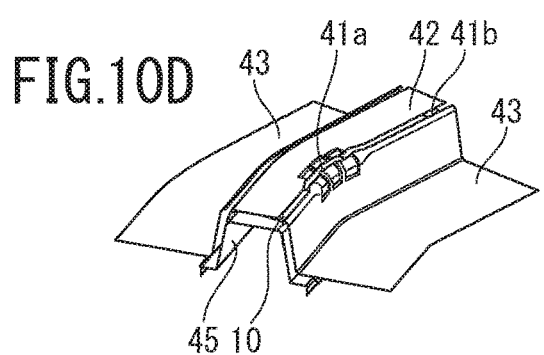 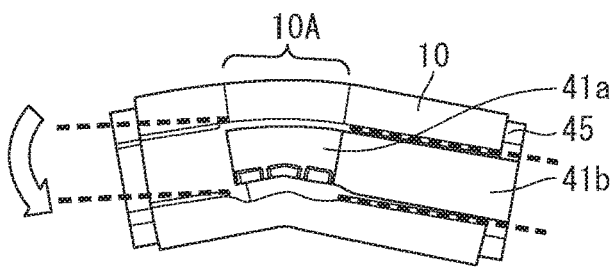
FIG.10E 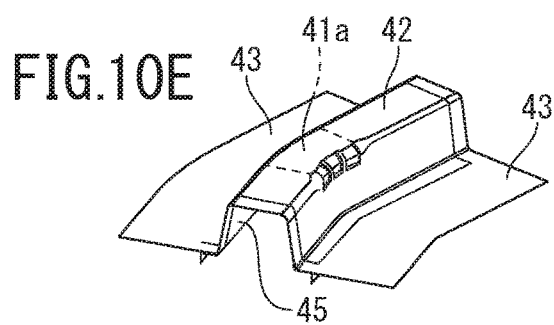 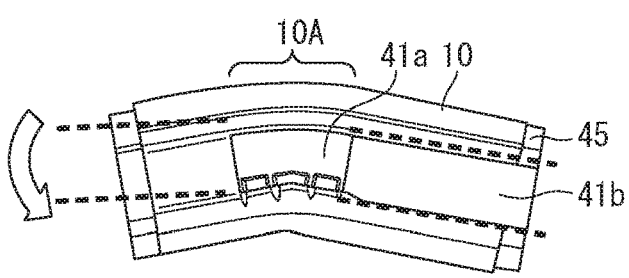

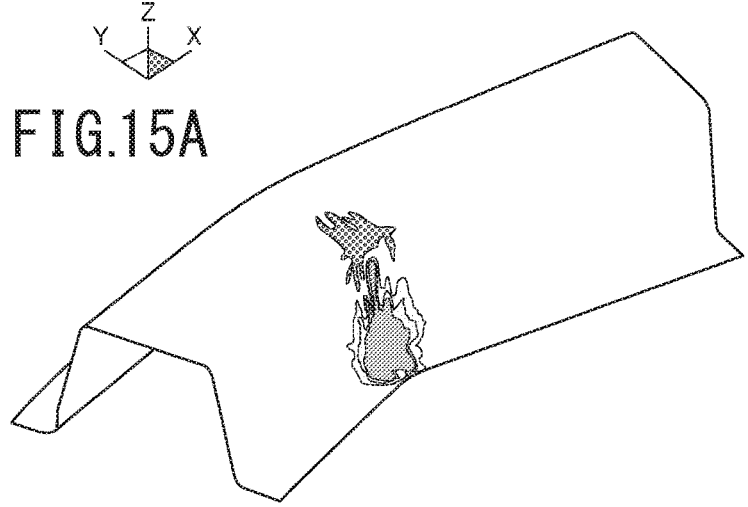
FIG.15A
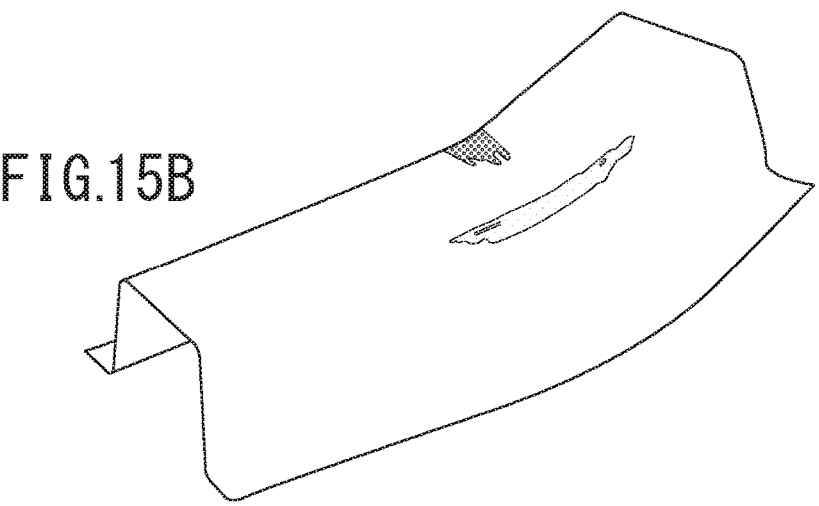
FIG.15B
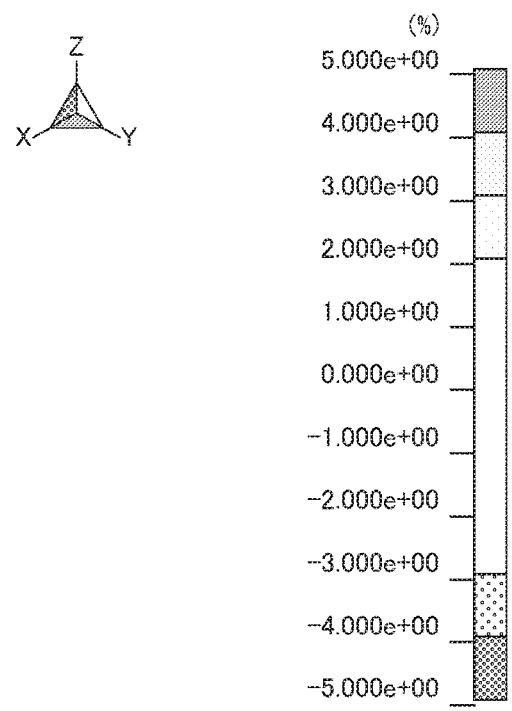

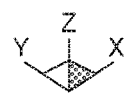
FIG.16A
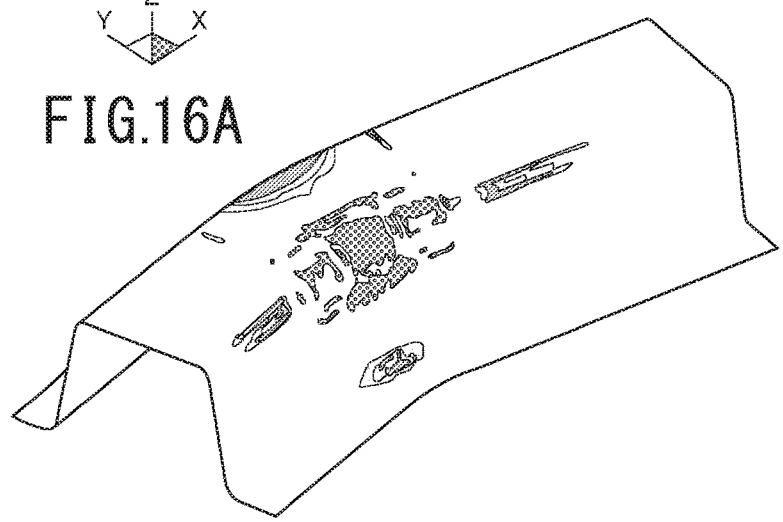
FIG.16B
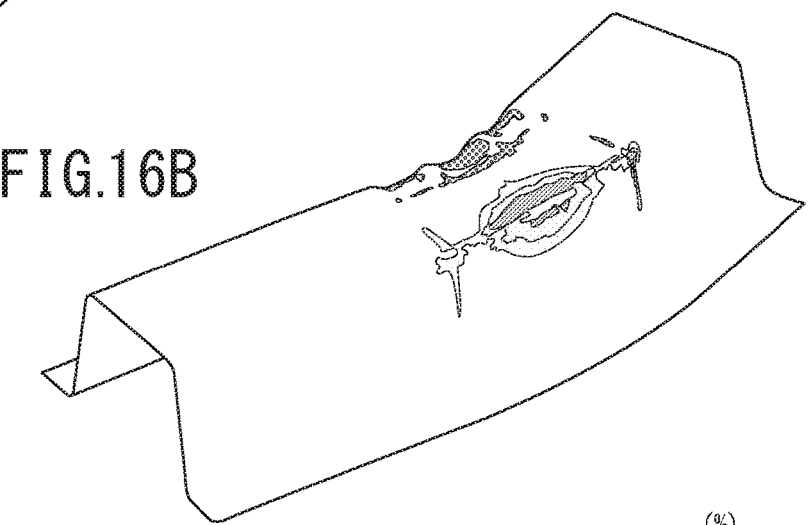
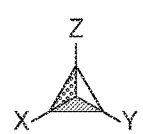
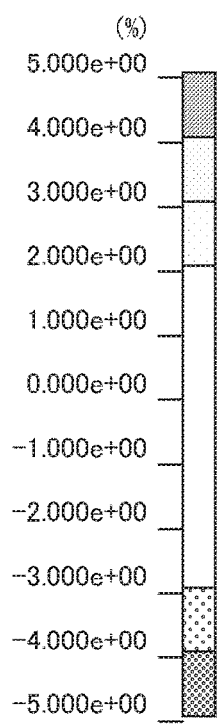

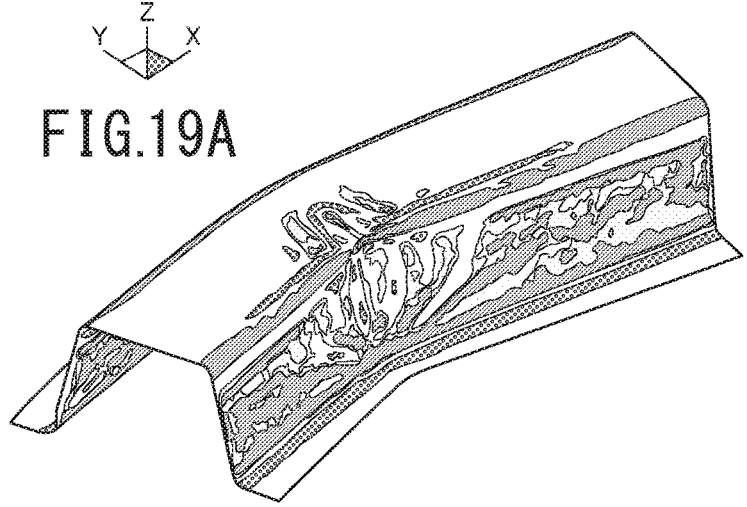
FIG.19A
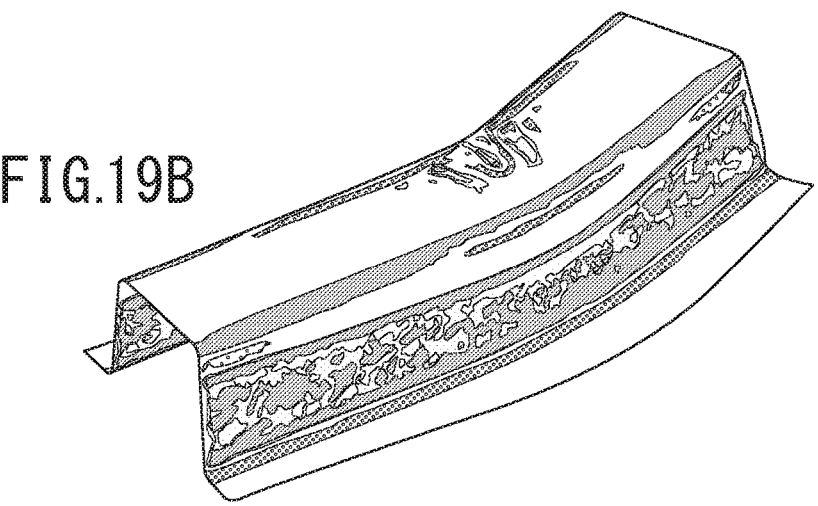
FIG.19B
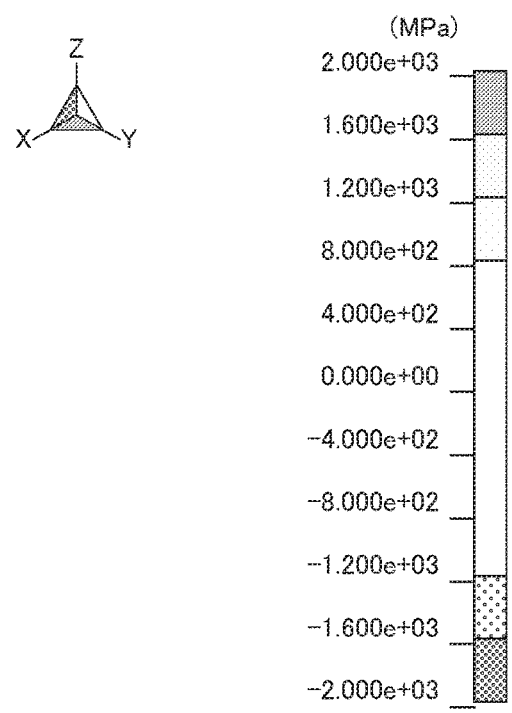

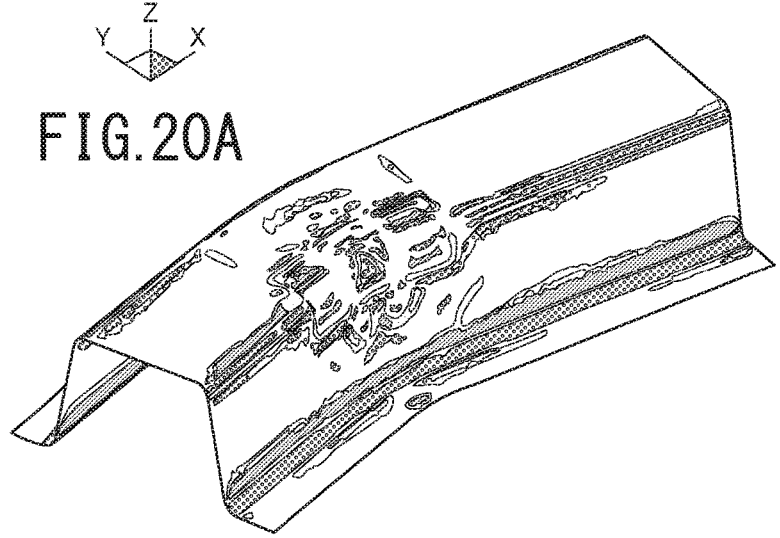
FIG.20A
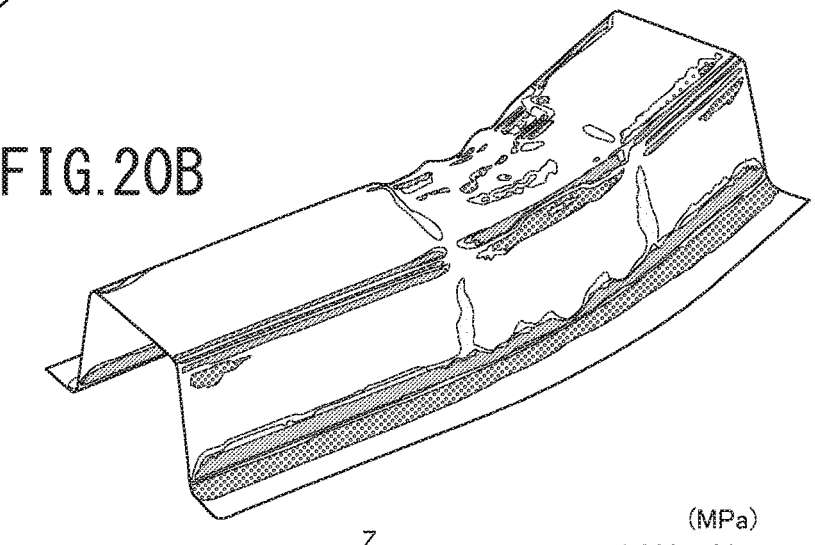
FIG.20B
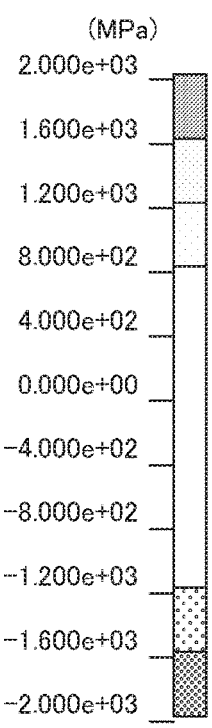

METAL SHEET FOR PRESS FORMING, PRESS FORMING DEVICE, AND PRODUCTION METHOD FOR PRESSED COMPONENT

TECHNICAL FIELD

The present invention is a technology relating to production of a press-formed component that has a hat-shaped cross-sectional shape including a vertical wall portion and a flange portion respectively continuous in left and right widthwise directions of a top sheet portion and that has a shape including one or more curved portions curved toward one side of the widthwise directions of the top sheet portion as seen in a plan view along a longitudinal direction of the top sheet portion. In particular, the invention is a technology suitable for production of a press-formed component that serves as a vehicle frame component.

BACKGROUND ART

Vehicle frame components are, for example, configured to have a hat-shaped cross-sectional shape including a vertical wall portion and a flange portion continuous on both sides of a widthwise direction of a top sheet portion and also have a component shape including, at least one part in a longitudinal direction of the top sheet portion, one or more curved portions curved in such a manner as to protrude toward one side of the widthwise direction of the top sheet portion as seen in a plan view. When press forming a metal sheet into a vehicle frame component having such a component shape, a crack or a wrinkle may occur on a part of a formed component, so that a forming defect may occur. Moreover, when the metal sheet is press formed into the component shape as described above, a spring-back or the like exceeding a predetermined amount easily occurs in the formed product after release, which causes a problem such as lowered dimensional accuracy.

Particularly, in recent vehicle frame components, use of a metal sheet formed by a thin high tensile strength steel sheet has been increasing in order to achieve both vehicle lightweighting and collision safety. However, with increased material strength (tensile strength) of the metal sheet, ductility of the metal sheet decreases, and spring-back becomes large. Due to this, when a high tensile strength steel sheet is simply press formed into a desired component shape, a problem becomes apparent, which is that a crack, a wrinkle, or a spring-back exceeding an acceptable level occurs in the press-formed component.

For example, when a metal sheet is press formed into a component shape as described above having a shape curved in the widthwise direction of the top sheet portion at a predetermined place along the longitudinal direction in a plan view, a crack due to shortage of material ductility easily occurs at the flange portion on a curved inner side (a curved recessed side) as seen in a plan view. Additionally, at the flange portion on a curved outer side (a curved protruding side) as seen in the plan view, a wrinkle due to material excess easily occurs. Furthermore, due to a stress difference in the longitudinal direction occurring between the top sheet portion and the flange portions in addition to opening of the cross section caused by spring-back, poor dimensional accuracy tends to occur, such as three-dimensional distortion of the produced press-formed component. To cope with phenomena of occurrence of these forming defects, some preventive technologies have conventionally been proposed.

Regarding a crack on the flange portion on the curved inner side in the press-formed component shape curved in the plan view, for example, PTL 1 describes a preventive method. PTL 1 proposes use of a metal sheet including a projection portion that protrudes toward a curved recessed side direction with respect to an outer edge portion of a crack risk portion so as to avoid deformation concentration during press forming.

Additionally, regarding a wrinkle at the flange portion on the outer side curved in the plan view, for example, PTL 2 describes a preventive method. PTL 2 proposes elimination of line length excess by providing a bead shape to a part where material excess occurs so that wrinkles are suppressed.

Furthermore, in PTL 3 to 5, when press forming into an intermediate formed component curved in the widthwise direction of a top sheet portion along a longitudinal direction at a first forming step, the intermediate formed component is formed to have a shape such that the width of the top sheet portion is different from that in a final product shape, and subsequently, at a second forming step, press forming is performed such that the shape of the intermediate formed component becomes the final product shape. PTL 3 to 5 propose this method to relieve a stress acting as a factor that causes the occurrence of spring-back.

CITATION LIST

Patent Literature

PTL 1: JP Pat. No. 6119848
PTL 2: JP Pat. No. 5217928
PTL 3: JP Pat. No. 4920649
PTL 4: JP Pat. No. 5031702
PTL 5: JP Pat. No. 5031703

SUMMARY OF INVENTION

Technical Problem

However, the method described in PTL 1 requires, as a step next to a press forming step of press forming into a desired press-formed component shape, a post step of cutting an unnecessary part.

In the method described in PTL 2, providing the bead shape to eliminate the material excess can significantly change the component shape, so that the bead shape that can be provided is limited.

Additionally, in the method described in PTL 3 to 5, if a crack or a wrinkle occurs during forming of the intermediate formed component by press forming of the first forming step that is a first step, application to press forming is difficult. Furthermore, in the method described in PTL 3 to 5, when drawing is employed as forming of the first forming step, large warping occurs on the vertical wall portions, which makes it difficult to take countermeasures at the next step and thereafter.

The present invention has been made in view of the above-described problems, and it is an object of the invention to provide a technology capable of further reducing forming defects such as cracks, wrinkles, and lowered dimensional accuracy when producing, by press forming, a press-formed component having a hat-shaped cross-sectional shape and including one or more curved portions curved toward one side of a widthwise direction of a top sheet portion in a plan view along a longitudinal direction.

Solution to Problems

The present inventors conducted intensive studies about a press forming method capable of forming, without cracks and wrinkles, a press-formed component shape (a final component shape) that has a hat-shaped cross-sectional shape including a top sheet portion and a vertical wall portion and a flange portion continuous to the top sheet portion and that includes a curved portion at least one or more places in a longitudinal direction of the top sheet portion as seen in a plan view and capable of suppressing spring-back. As a result of the studies, the present inventors obtained a knowledge that excess and shortage of material at the flange portions that becomes a factor causing the occurrence of a crack, a wrinkle, and spring-back can be reduced by forming while rotationally displacing a part of the material when forming the metal sheet into the press-formed component shape. Additionally, the present inventors obtained a knowledge that material shortage at the top sheet portion that becomes a factor causing the occurrence of spring-back can be significantly reduced by previously performing stretch forming at a predetermined place at a pre-step before a step of forming into the press-formed component shape to secure a line length likely to become insufficient.

The present invention has been made on the basis of such findings.

Then, to solve the problems, a metal sheet for press forming according to one aspect of the present invention, which is a metal sheet for press forming that is press formed into a press-formed component shape that has a hat-shaped cross-sectional shape including a vertical wall portion and a flange portion on both sides of a widthwise direction of a top sheet portion and that includes, at one or more places along a longitudinal direction of the top sheet portion, a curved portion curved in such a manner as to protrude toward one side of the widthwise direction of the top sheet portion as seen in a plan view, in which, in a developed shape of the press-formed component shape developed on a plane in such a manner that, in a region corresponding to the curved portion, a line length of a position corresponding to a ridge line between the top sheet portion and the vertical wall portion in the press-formed component shape is equal to a line length of the ridge line, a boundary between the region corresponding to the curved portion of the developed shape and an other region is rotationally displaced in-plane around a rotational center set at a position on a curved recessed side rather than a position corresponding to a ridge line between the top sheet portion and the vertical wall portion on the curved recessed side, in a direction in which a line length of an outer edge of a position to be formed into the flange portion on a curved protruding side in the developed shape approaches a line length of an outer edge of the flange portion on the curved protruding side in the press-formed component shape.

Additionally, a press forming device according to one aspect of the present invention is a press forming device configured to press form a metal sheet for press forming according to the one aspect of the present invention into a press-formed component shape that has a hat-shaped cross-sectional shape including a vertical wall portion and a flange portion on both sides of a widthwise direction of a top sheet portion and that includes, at one or more places along a longitudinal direction of the top sheet portion, a curved portion curved in such a manner as to protrude toward one side of the widthwise direction of the top sheet portion in a plan view, the press forming device including an upper die including a die, a pad, and bending blades and a lower die including a punch facing the pad in a pressing direction, in which the pad is divided into a first pad configured to pressurize the region corresponding to the curved portion in the top sheet portion and a second pad configured to pressurize a region of a linear portion other than the curved portion in the top sheet portion, and in which the bending blades are configured to be capable of bending the vertical wall portions and the flange portions.

In addition, a method for producing a press-formed component according to one aspect of the present invention includes placing the metal sheet of the one aspect of the present invention on a punch; then causing an upper die to descend toward a lower die to pinch a position of a top sheet portion by a pad of the upper die and the punch; and causing the upper die to further descend to perform bending of vertical wall portions and flange portions by bending blades of the upper die, in which the press-formed component is produced by making a pressurization force applied to the top sheet portion by the pad at a linear portion position other than a curved portion relatively larger than the pressurization force at a curved portion position to perform the bending.

Advantageous Effects of Invention

According to the one aspect of the present invention, there is provided a technology capable of press forming into a press-formed component having a hat-shaped cross-sectional shape and including one or more curved portions curved toward one side of the widthwise direction of a top sheet portion in a plan view along the longitudinal direction of the top sheet portion, can be press formed with further reduced forming defects such as cracks, wrinkles, and lowered dimensional accuracy.

BRIEF DESCRIPTION OF DRAWINGS

FIG. 1 is a diagram illustrating one example of a press-formed component shape, in which

FIG. 2 is a diagram listing examples of a press-formed component shape to which the present invention is applicable;

FIG. 10 is a diagram illustrating movement of a material at the main forming step;

FIG. 15 is a diagram illustrating sheet thickness reduction rates at a bottom dead center when formed by conventional drawing in Example;

FIG. 16 is a diagram illustrating sheet thickness reduction rates at a bottom dead center when formed on the basis of the present invention in Example;

FIG. 19 is a diagram illustrating a sheet thickness front-back stress difference distribution in a widthwise direction at the bottom dead center when formed by the conventional drawing in Example;

FIG. 20 is a diagram illustrating a sheet thickness front-back stress difference distribution in a widthwise direction at the bottom dead center when formed on the basis of the present invention in Example;

DESCRIPTION OF EMBODIMENTS

Next, embodiments of the present invention will be described with reference to the drawings.

Figure 1A:
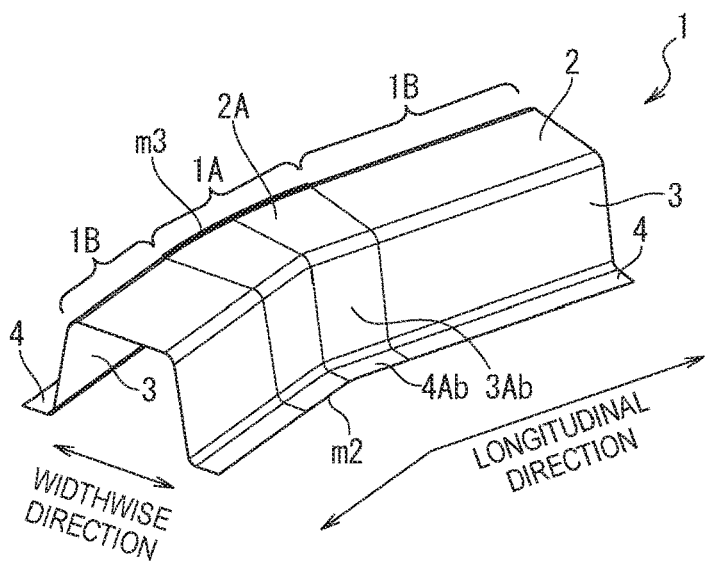
FIG. 1A is a perspective view.
Figure 1B:
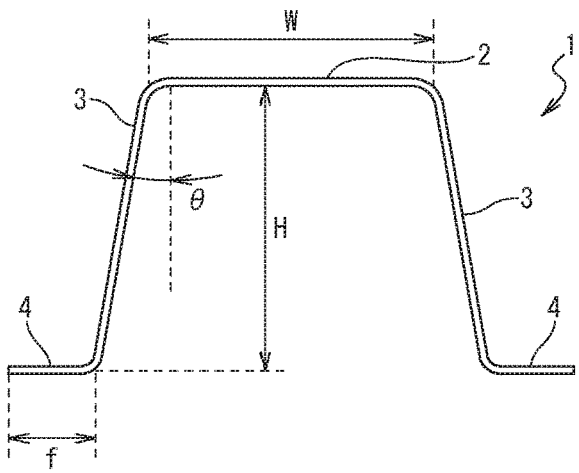
FIG. 1B is a cross-sectional view.

The following description of the embodiments will be provided by taking, as an example, a case where a metal sheet is press formed into a press-formed component shape 1 as illustrated in FIG. 1 to produce a final component. The press-formed component shape 1 illustrated in FIG. 1 is a hat-shaped cross-sectional shape including a top sheet portion 2 and a vertical wall portion 3 and a flange portion 4 respectively continuous on both sides of a widthwise direction of the top sheet portion 2, and includes, at a certain position along a longitudinal direction of the top sheet portion 2, a curved portion 1A curved in such a manner as to protrude toward one side of the widthwise direction of the top sheet portion 2 as seen in a plan view. In FIG. 1, reference sign 2A denotes the top sheet portion at the curved portion 1A. Reference sign 3Aa denotes the vertical wall portion on a curved protruding side at the curved portion 1A. Reference sign 4Aa denotes the flange portion on the curved protruding side at the curved portion 1A. Reference sign 3Ab denotes the vertical wall portion on a curved recessed side at the curved portion 1A. Reference sign 4Ab denotes the flange portion on the curved recessed side at the curved portion 1A.

A metal sheet 10 for use in production of a press-formed component of the present embodiment is particularly suitably effective in cases where the metal sheet 10 is made of a high tensile strength steel material, such as a material having a tensile strength of 590 MPa or more.

However, the present invention is applicable even to production of a press-formed component having a shape including the curved portion 1A at a plurality of places along the longitudinal direction as seen in a plan view. In the case including the curved portions 1A of the plurality of places, directions of curves of the adjacent curved portions 1A may be the same or different, as seen in a plan view. FIG. 2 illustrates examples of the press-formed component shape 1 that is a subject of the present invention. As illustrated in FIG. 2, the press-formed component shape 1 as the subject of the present invention is any press-formed component shape that includes, at a certain position along the longitudinal direction of the top sheet portion 2, the curved portion 1A curved in such a manner as to protrude toward one side of the widthwise direction of the top sheet portion 2 as seen in a plan view. In the press-formed component shape 1, the adjacent curved portions 1A may be continuously formed in the plan view, where any linearly extending portion does not have to be present between the adjacent curved portions 1A. Additionally, the press-formed component shape 1 may include a portion curved up and down along the longitudinal direction, as seen in a side view. In addition, in the press-formed component shape 1, any linear portion 1B does not have to be present between the adjacent curved portions 1A.

Figure 1C:
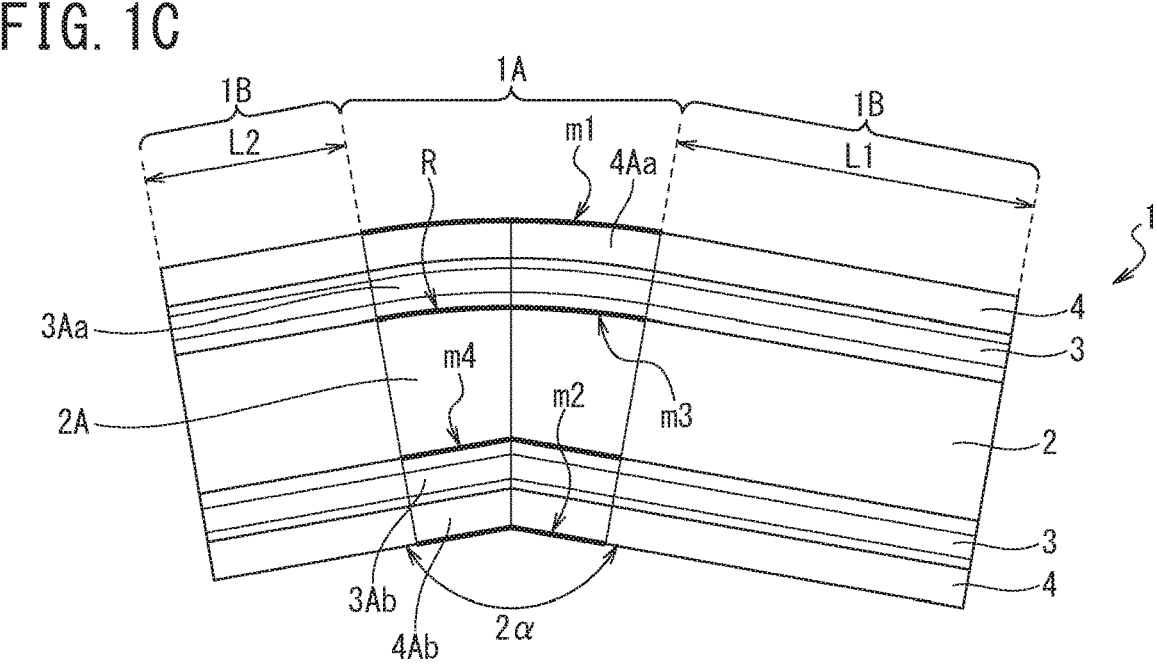
FIG. 1C is a plan view.

Herein, in the press-formed component shape 1 illustrated in FIG. 1, FIG. 1C exemplifies a case where the curved portion 1A is curved in such a manner as to protrude on an upper side of the paper (recessed on a lower side of the paper). Note that, in the present specification, the curved protruding side is referred to also as curved outer side, and the curved recessed side is referred to also as curved inner side.

<Regarding Metal Sheet 10 for Press Forming>

Figure 3:
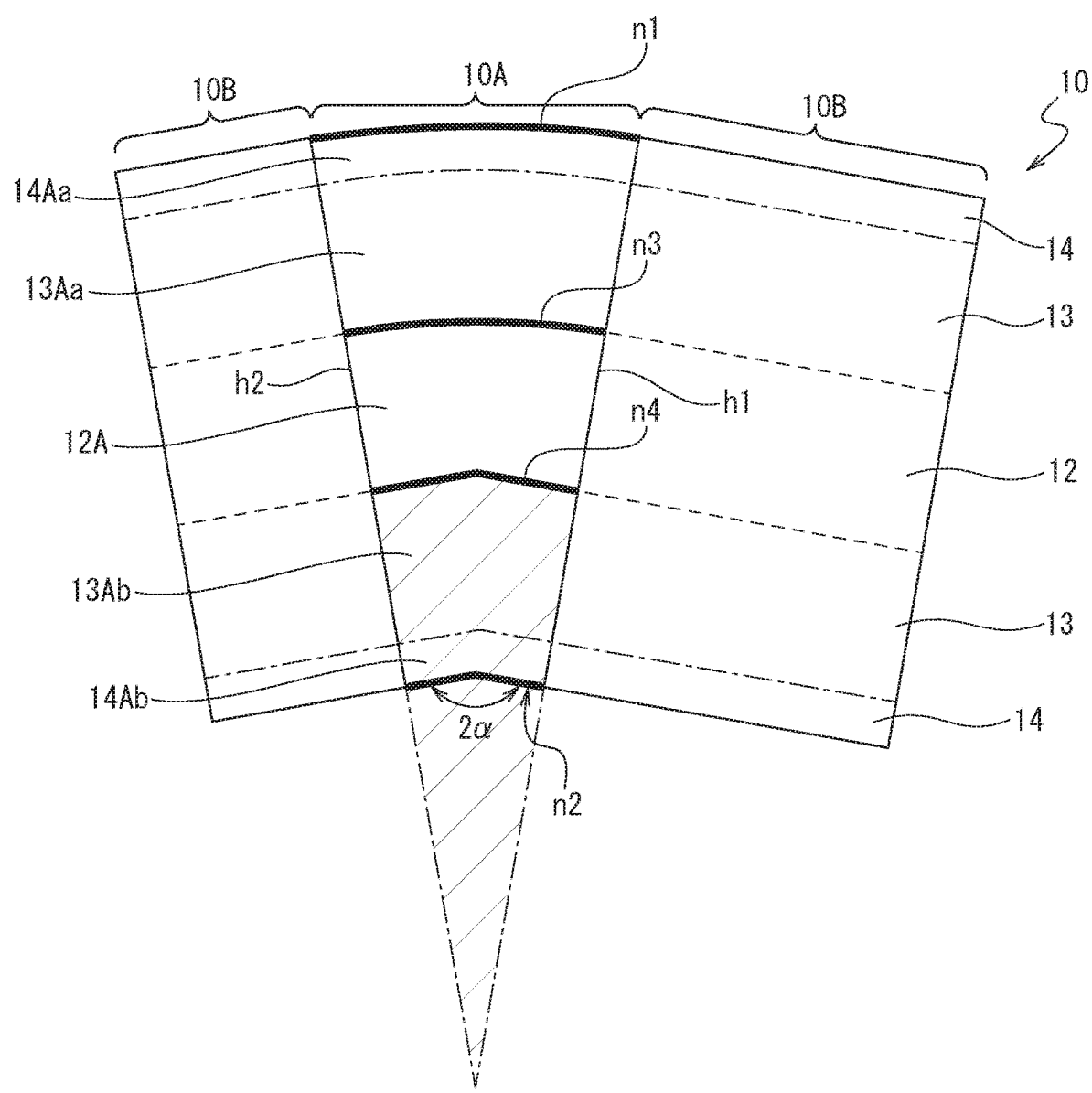
FIG. 3 is a diagram illustrating a developed shape of a metal sheet obtained by developing on a plane the press-formed component shape illustrated in FIG. 1.

When producing a component having the press-formed component shape 1 illustrated in FIG. 1 by press forming, an example of the metal sheet 10 to be used is a metal sheet 10 blanked into a developed shape of the desired press-formed component shape 1 developed on a plane, as illustrated in FIG. 3. In the case of the present example, the press-formed component shape 1 includes one curved portion 1A and linear portions 1B on the left and right thereof, so that the developed shape also includes the one curved portion 10A and the linear portions 10B on the left and right thereof.

In the above developed shape, the left and right linear portions 10B have a shape developed with dimensions of the press-formed component shape 1. On the other hand, generally, the curved portion 10A is developed in such a manner that a line length of a position n3 corresponding to a ridge line m3 (particularly, on the curved protruding side) between the top sheet portion 2 and the vertical wall portion 3 is equal to a line length in the press-formed component shape 1, and, in a plan view, an angle 2α formed by the flange portion 4Ab on the curved recessed side of the press-formed component shape 1 is equal to an angle formed by the flange portion 4 on the curved recessed side (an angle formed between the left and right linear portions 1B on the curved inner side) in the developed shape. Note that FIG. 1 is an example where the contour of an outer edge m2 on the curved recessed side has a shape with a combination of two straight lines, and thus the developed shape is also illustrated so as to have a line length of a curve n2 formed by two straight lines. However, if the contour of the outer edge m2 on the curved recessed side has an arc shape, the contour of the outer edge n2 on the curved recessed side of the developed shape also becomes arc-shaped.

In the metal sheet 10 having the developed shape as described above, at the curved portion 10A, a length of an outer edge n1 on the curved protruding side of the metal sheet 10 corresponding to a length of an outer edge m1 of the flange portion 4Aa (see FIG. 1) on the curved outer side in the press-formed component shape 1 is in a relationship of "line length of m1<line length of n1". Additionally, a length of the outer edge n2 on the curved inner side of the metal sheet 10 corresponding to a length of the outer edge m2 of the flange portion 4Ab (see FIG. 1) on the curved inner side in the press-formed component shape 1 is in a relationship of "line length of m2> line length of n2". Thus, when the metal sheet 10 having the above-described developed shape (see FIG. 3) is press formed into the press-formed component shape 1 of FIG. 1, there is material excess on the curved outer side, causing wrinkles, whereas there is material shortage on the curved inner side, causing cracks.

Figure 4:
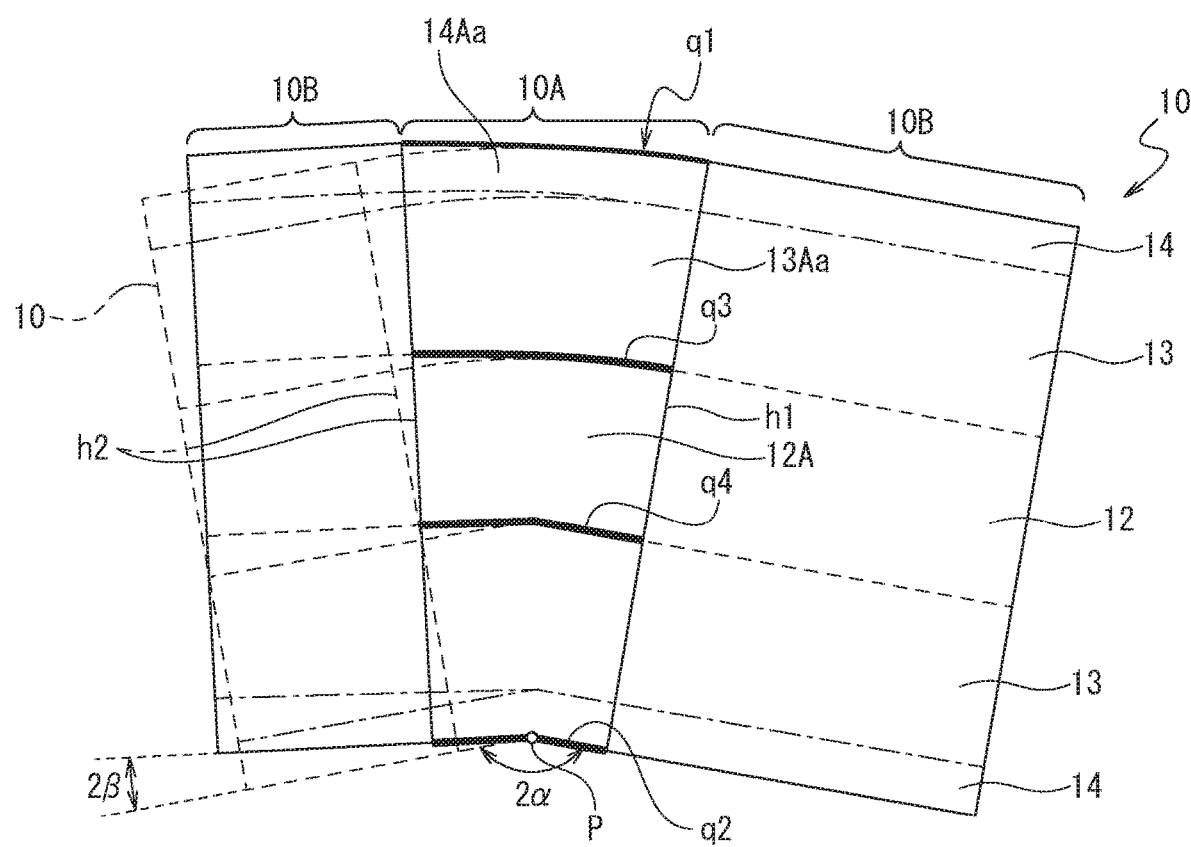
FIG. 4 is a diagram illustrating an example of a sheet shape (a developed shape after rotational displacement) of the metal sheet (the metal sheet to be press formed) after rotationally displacing a boundary between a region of a curved portion and an other region in the developed shape.

Accordingly, in the present embodiment, the metal sheet 10 for press forming is configured to have a sheet-shape as illustrated in FIG. 4, which sheet-shape is formed by changing the developed shape simply developed as described above to a shape in which a boundary h2 between the curved portion 10A and the linear portion 10B is rotationally displaced in-plane around a rotational center P set within a region (indicated by hatching in FIG. 3) positioned on the curved recessed side rather than a position n4 corresponding to a ridge line m4 between the top sheet portion 2 and the vertical wall portion 3 on the curved recessed side. Note that the developed shape after the rotational displacement (the metal sheet having the rotationally displaced shape) is referred to also as modified developed shape.

The direction of the in-plane rotational displacement is set to a direction in which, in a fan-shaped region of the curved portion 10A in the developed shape simply developed as described above, the line length of the position n1 that becomes the outer edge of the flange portion 14Aa on the curved protruding side approaches the line length of the outer edge m1 of the flange portion 4Aa on the curved protruding side in the press-formed component shape (i.e., to a direction in which the line length of n1 becomes shorter), and to a direction in which the line length of the outer edge n2 of the position 14Ab to be formed into the flange portion 4Ab on the curved recessed side approaches the line length of the position m2 that becomes the outer edge of the flange portion 4Ab on the curved recessed side in the press-formed component shape (i.e., to a direction in which the line length of n2 becomes longer).

Note that, in the example of FIG. 4, only the boundary h2 on one side is rotationally displaced.

The amount of rotational displacement is preferably set such that a difference between a line length of an outer edge q1 of a position to be formed into the flange portion 4Aa on the curved protruding side in the modified developed shape and a line length of an outer edge m1 of the flange portion 4Aa on the curved protruding side in the press-formed component is equal to or less than 10% of the outer edge m1 of the flange portion 4Aa on the curved protruding side in the press-formed component shape.

Figure 5:
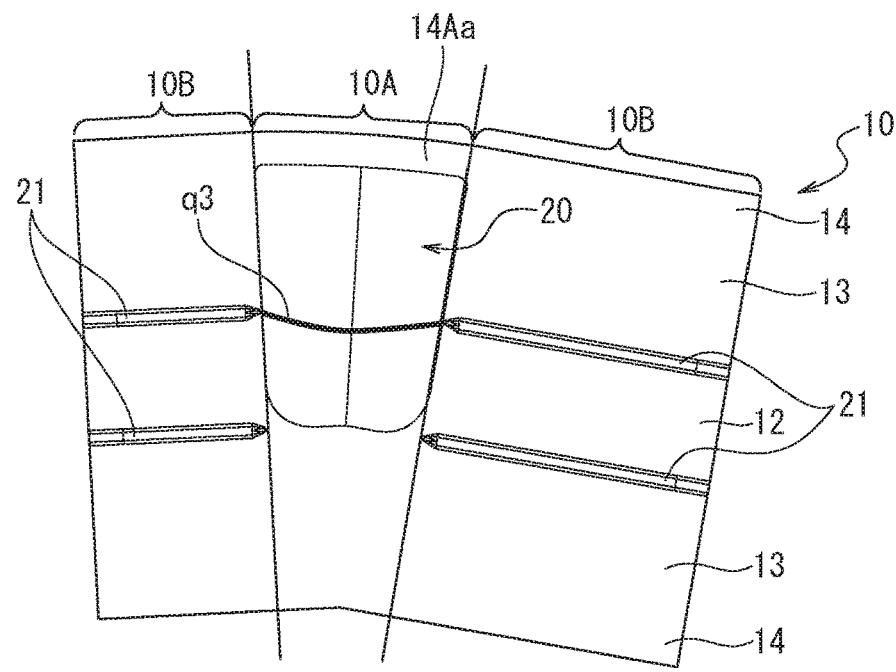
FIG. 5 is a diagram illustrating an example of the sheet shape of the metal sheet provided with a projection portion and a bead shape.

Furthermore, in the modified developed shape, preferably, a projection portion 20 protruding in an out-of-plane direction is formed in regions 12A and 13Aa corresponding to the top sheet portion 2A and the vertical wall portion 3Aa on the curved protruding side in the region corresponding to the curved portion 1A (see FIG. 5). In this case, it is preferable to set such that with the projection portion 20, a difference between a line length of a position q3 corresponding to the ridge line m3 between the top sheet portion 2 and the vertical wall portion 3 on the curved protruding side and the line length of the ridge line m3 between the top sheet portion 2 and the vertical wall portion 3 on the curved protruding side in the press-formed component shape is equal to or less than 10% of the line length of the ridge line m3 between the top sheet portion 2 and the vertical wall portion 3 on the curved protruding side in the press-formed component shape. Note that the direction in which the projection portion 20 projects may be downward.

Additionally, preferably, in the region of each linear portion 10B other than the region 10A (the curved portion of the metal sheet 10) corresponding to the curved portion 1A, at least one of a position corresponding to a ridge line between the top sheet portion 2 and the vertical wall portion 3 or a position corresponding to a ridge line between the vertical wall portion 3 and the above flange portion 4, the bead shape 21 or a crease shape extending in a direction along the ridge line is provided at least one place (see FIG. 5). FIG. 5 illustrates an example provided with the bead shapes 21.

Hereinafter, a description will be given of a specific example regarding the shape of the metal sheet 10 for press forming of the present embodiment. In other words, the description will be given of an example of design change in the shape of the curved portion 10A from the simply-developed developed shape to a modified developed shape.

As an example, a case will be described where the above-mentioned rotational center P is set at a center position of the outer edge n2 (see FIG. 3) on the curved recessed side in the developed shape (see FIG. 4).

The shape of the metal sheet 10 for press is designed so as to be a shape (a modified developed shape) in which the boundary h2 between the curved portion 10A and the linear portion 10B is rotationally displaced by 2β (deg) in a direction in which an angle formed by the curved recessed side (an angle formed by the flange portion 4 on the inner side of the curved portion 1A in the press-formed component shape 1) increases, around the rotational center P that is a center position of the outer edge (an angle of the flange portion 4Ab) on the curved inner side of the metal sheet 10 in the simply-developed press-formed component shape 1 so that the length of the outer edge portion q1 on the curved protruding side of the metal sheet 10 satisfies "line length of m1=line length of q1". Herein, in FIG. 4, a broken line indicates a developed shape before the rotation.

Herein, when rotationally displaced in-plane around the above rotational center P in the direction in which the line length of the outer edge on the curved protruding side of the metal sheet 10 becomes shorter, the line length of the outer edge portion n2 on the curved recessed side changes to become longer. FIG. 4 exemplifies the case where, in the region corresponding to the curved portion 1A, a boundary h1 with the right linear portion 1B is fixed, and the boundary h2 with the left linear portion 1B is rotationally displaced to change the above-mentioned line length. The boundaries h1 and h2 on both sides may be respectively rotationally displaced. For example, the boundaries h1 and h2 on both sides are respectively rotationally displaced by β each.

Additionally, the position of the rotational center P may be adjusted so as to satisfy "line length of m2=line length of q2".

In this example, from a geometrical relationship between the sheet shape (the modified developed shape) of the metal sheet 10 rotationally displaced as above and the press-formed component shape 1, the value of 2β that satisfies "line length of m1=line length of q1" is calculated.

A specific calculation method is as follows:

Herein, as in FIG. 1, a curvature radius of the ridge line m3 between the top sheet portion 2 and the vertical wall portion 3 on the curved protruding side is defined as R (mm), a width of the top sheet portion 2 as W (mm), a vertical height of the vertical wall portion 3 as H (mm), an angle formed between a horizontal surface of the top sheet portion 2 and the vertical wall portion 3 as θ (deg), and a width of the flange portion 4 as f (mm).

In this case, in an expression of f(β) in the following expressions, when β satisfies f(β)=0, "the line length of m1=line length of q1" is valid.

$$f(\beta) = BE(90 - \alpha - \beta)^3 - CE(90 - \alpha - \beta)^2 - BD(90 - \alpha - \beta) + CD - A \quad \text{[Math 1]}$$

in which $$A = (R - W)\sin(90 - \alpha)$$

$$B = W + \frac{H}{\cos\theta} + f$$

$$C = (90 - \alpha)(R + H\tan\theta + f)$$

$$D = \frac{\pi}{180}$$

$$E = \frac{1}{6}\left(\frac{\pi}{180}\right)^3$$

However, when a margin is provided, and β satisfying f(β)=0 is β', the angle β to be applied to the rotational displacement may be designed so as to satisfy the following expression:

$$0.9 \times \beta' \leq \beta \leq 1.1 \times \beta'$$

Additionally, the line length of q1 may be designed so as to satisfy the following expression:

0.9×line length of m1≤line length of q1≤1.1×line length of m1

<Projection Portion 20>

In the sheet shape after the modification (the modified developed shape), the line length of the position q3 corresponding to the ridge line m3 between the top sheet portion 12 and the vertical wall portion 13Aa on the curved protruding side becomes shorter than the line length of the ridge line m3 in the press-formed component shape 1.

Considering this, in the above sheet shape (the modified developed shape), preferably, the projection portion 20 protruding in an out-of-plane direction is formed in the region of a top sheet portion 12A and the vertical wall portion 13Aa on the curved protruding side in the region 10A corresponding to the curved portion 1A. By doing this, the line length of the position q3 corresponding to the ridge line m3 between the top sheet portion 2 and the vertical wall portion 3 on the curved protruding side in the metal sheet 10 is designed so as to approach the line length in the press-formed component shape 1.

In the case of the present example, the projection portion 20 is designed such that an increased amount ΔL of the line length of the position q3 corresponding to the ridge line m3 between the top sheet portion 12 and the vertical wall portion 13Aa on the curved protruding side in the metal sheet 10 satisfies the following expression:

$$0.9 \times \frac{\pi}{90}\left[R(90-\alpha) - \left\{\frac{(R-W)\sin(90-\alpha)}{\sin(90-\alpha-\beta)}\right\}(90-\alpha-\beta)\right] \leq \Delta L \leq \quad \text{[Math 2]}$$

$$1.1 \times \frac{\pi}{90}\left[R(90-\alpha) - \left\{\frac{(R-W)\sin(90-\alpha)}{\sin(90-\alpha-\beta)}\right\}(90-\alpha-\beta)\right]$$

By designing so as to satisfy the expression, the line length of the position q3 corresponding to the ridge line m3 between the top sheet portion 12 and the vertical wall portion 13Aa on the curved protruding side in the metal sheet 10 approaches the line length of the corresponding ridge line m3 in the press-formed component shape 1. Specifically, it is possible to set to a line length difference of 10% or less.

Note that, preferably, the projection portion 20 is designed into a protruding shape such that, regarding an amount of the line length increased in the longitudinal direction by formation of the projection portion, the increased amount at the line length position of the ridge line between the top sheet portion 2 and the vertical wall portion 3 on the curved protruding side in the metal sheet 10 is the largest.

<Regarding Bead Shape 21 and Crease>

In addition, as illustrated in FIG. 5, it is preferable to form, at least one of positions corresponding to ridge lines of each linear portion 10B, a bead shape 21 extending along the ridge line. FIG. 5 is an example where the bead shape 21 is formed at positions corresponding to the ridge lines on both sides of the top sheet portion 2, but the invention is not limited thereto. The bead shape 21 may be also formed at positions corresponding to ridge lines between the vertical wall portion 3 and the flange portion 4 or at only some of the ridge lines at the ridge-line positions. Additionally, it is unnecessary to form the bead shape 21 over an entire length of one ridge line, and the bead shape 21 may be intermittently formed along the ridge line. When forming the bead shape 21 at a part of the entire length of the ridge line, for example, the total length of the bead shape 21 is preferably set so as to be equal to or more than ⅓ of the entire length of the corresponding ridge line. Furthermore, instead of the bead shape 21, a crease may be formed. Furthermore, the bead shape 21 and a crease may be used in combination such that the bead shape 21 is provided at a part thereof, and the crease is provided at the other part thereof.

<Projection Portion Forming Step>

Next will be a description of a method for forming the projection portion 20 by press forming the flat sheet-shaped metal sheet 10. The projection portion forming step is a step of forming the projection portion 20 by stretch forming the metal sheet 10. The projection portion 20 may be provided by drawing or stamping. The following description will exemplify formation by drawing.

Herein, in the sheet shape as in FIG. 4 obtained by changing the shape of the curved portion 10A in the developed shape as described above, the length of the position q3 corresponding to the ridge line m3 of the top sheet portion 2 on the curved protruding side of the metal sheet 10 is designed by rotationally displacing by 2β in-plane around the rotational center P. Due to this, the length of the position q3 becomes shorter than the line length of the ridge line m3 of the top sheet portion 2 on the curved protruding side in the press-formed component shape 1. As a result, if press forming is performed as it is, tensile deformation is accordingly applied to the produced press-formed component. The applied tensile deformation becomes a factor that causes spring-back. Thus, preferably, the projection portion 20 is formed on the metal sheet 10 at the projection portion forming step to secure the line length up to the same amount as the length of the ridge line m3 of the top sheet portion 2 on the curved protruding side in the press-formed component shape 1.

Figure 6:
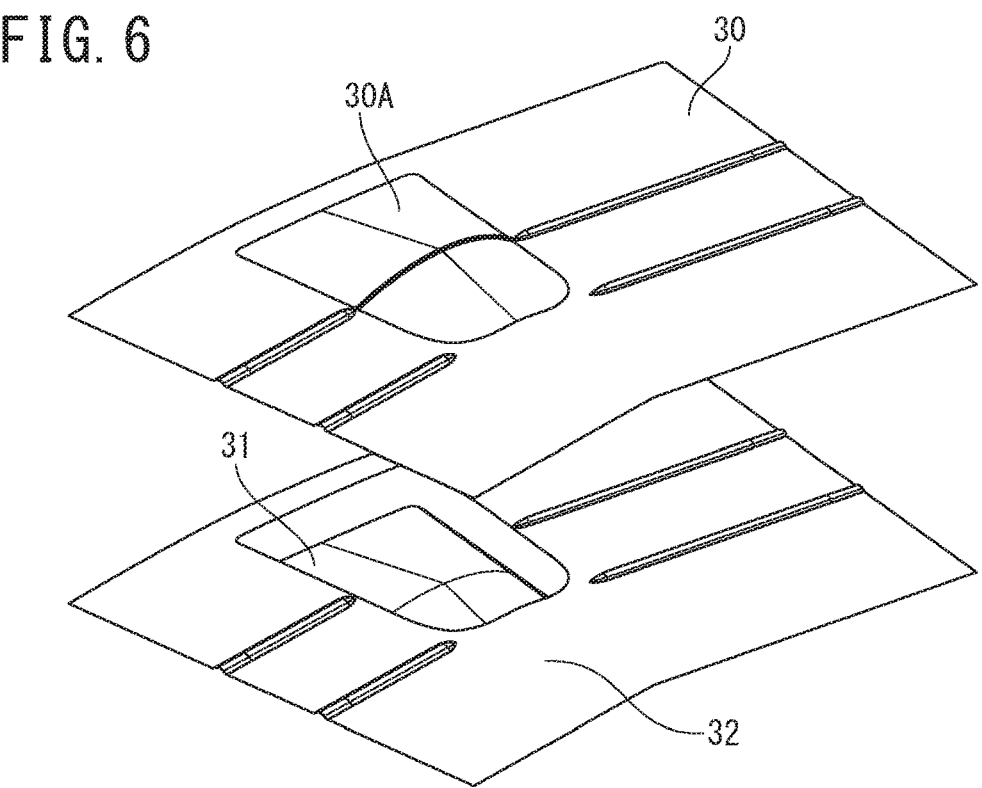
FIG. 6 is a diagram describing an example of a die for use in a projection portion forming step of providing the projection portion and the bead shape.

From such a viewpoint, at the projection portion forming step of the present embodiment, a drawing die is prepared that includes an upper die formed by a die 30 and a lower die formed by a punch 31 and a blank holder 32, for example, as illustrated in FIG. 6, and stretch forming for forming the projection portion 20 is performed by the drawing die. The die 30 is provided with a recessed portion 30A corresponding to the shape of the projection portion 20 at a portion facing the punch 31.

The length of the projection portion 20 at the position q3 corresponding to the ridge line m3 is designed so as to be longer by ΔL than a length before forming the projection portion 20. Herein, ΔL may be set on the basis of the above description.

The shape of the projection portion 20 in the present embodiment is designed, for example, as illustrated in FIG. 5, in such a manner as to project across positions corresponding to the top sheet portion 12A of the curved portion 10A and the vertical wall portion 13Aa on the curved protruding side. Additionally, the shape of the projection portion 20 is preferably designed so as to be a dome-like shape such that a maximum projection height is given at the position q3 where the required line length ΔL is secured, and the projection height is gradually reduced toward the widthwise direction of the top sheet portion 2. However, the shape of the projection portion 20 may be another contour shape as long as the line length can be secured.

Furthermore, the die illustrated in FIG. 6 is set such that, at the projection portion forming step in advance, the bead shape 21 is provided at the positions corresponding to the ridge lines adjacent to the top sheet portion 2 in the press-formed component shape 1, except for the position for forming the projection portion 20. With the metal sheet 10 provided with the bead shapes 21, bending forming into the desired press-formed component shape 1 is stabilized. Although FIG. 5 exemplifies the case of provision of the bead shape 21, a crease may be provided instead of the bead shape 21. In addition, there may be provided a combination of the bead shape 21 provided at some of the ridge line positions and a crease or the like provided at other ridge line positions.

<Main Forming Step into Press-Formed Component Shape 1>

The present embodiment exemplifies the case of use of the metal sheet 10 including the projection portion 20 and the bead shape 21 formed at the projection portion forming step, as the shape of the metal sheet 10 to be formed at a main forming step (see FIG. 5). However, the metal sheet 10 without both or one of the projection portion 20 and the bead shape 21, as in FIG. 4 or the like, may be used as the metal sheet 10 for the main forming step, although processing accuracy is slightly reduced.

Press forming the above-described metal sheet 10 at the main forming step enables the press-formed component shape 1 to be obtained with suppressed cracks, wrinkles, and spring-back. When it is desired to further improve dimensional accuracy or desired to provide a required shape to the component, a forming step for the purpose of restrike may be added as a step after the main forming step.

Figure 7:
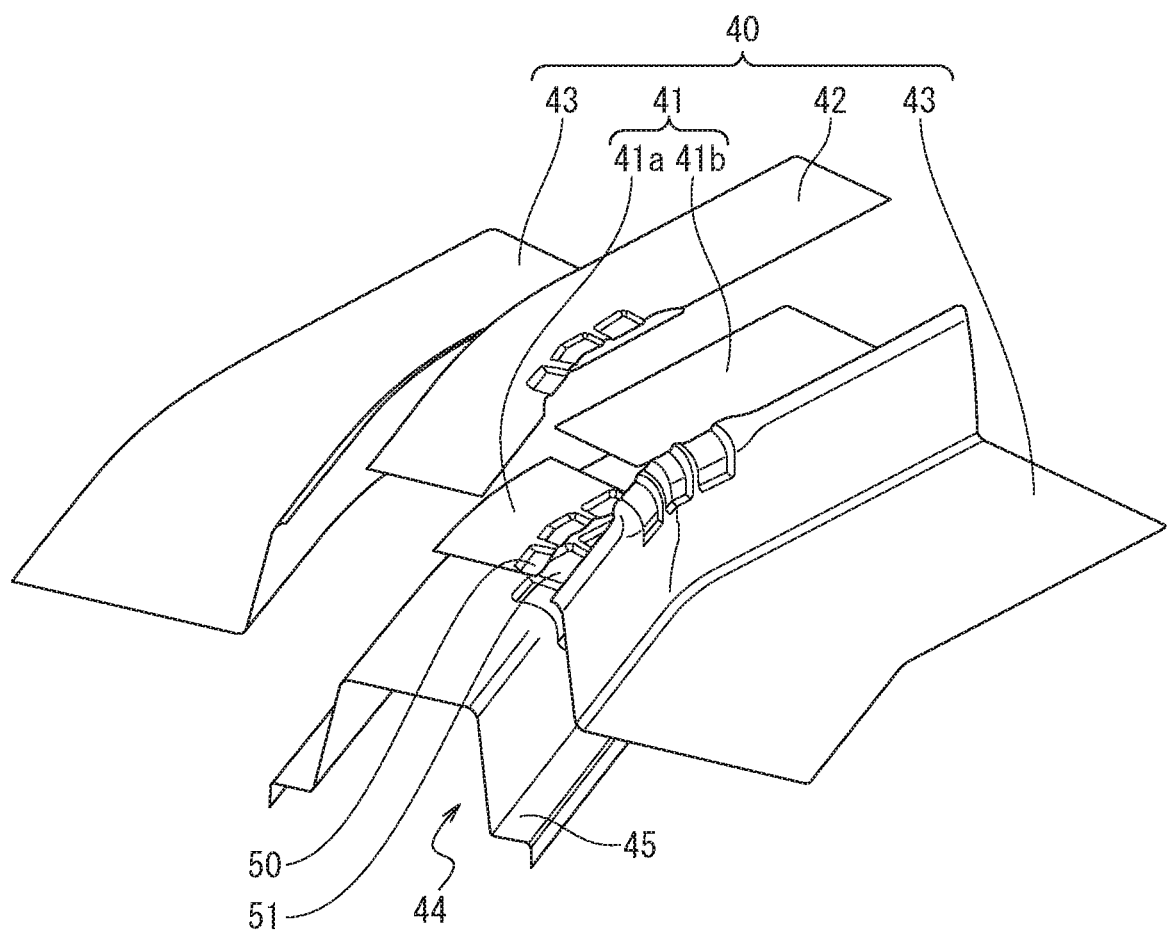
FIG. 7 is a diagram describing an example of a bending die for use in a main forming step.

The main forming step is a step of bending the metal sheet 10 to process into the final press-formed component shape 1. A bending die to be used at the main forming step includes an upper die 40 and a lower die 44, as illustrated in FIG. 7.

The upper die 40 includes bending blades 43 that bend the ridge lines of the component and a pad 41 that presses the top sheet portion 2. The lower die 44 includes a punch 45.

The pad 41 that pressurizes the top sheet portion 2 in the present embodiment is divided into a pad 41a that pressurizes the top sheet portion 12A of the curved portion 10A and a pad 41b that pressurizes top sheet portions of the linear portions 10B other than the curved portion 1A. The pad 41b is preferably set so as to pressurize only the top sheet portion of one of the linear portions 1B positioned on both sides of the curved portion 1A therebetween.

Next, an example of movement of the bending die at the main forming step will be illustrated with reference to FIG. 8.

Figure 8A:
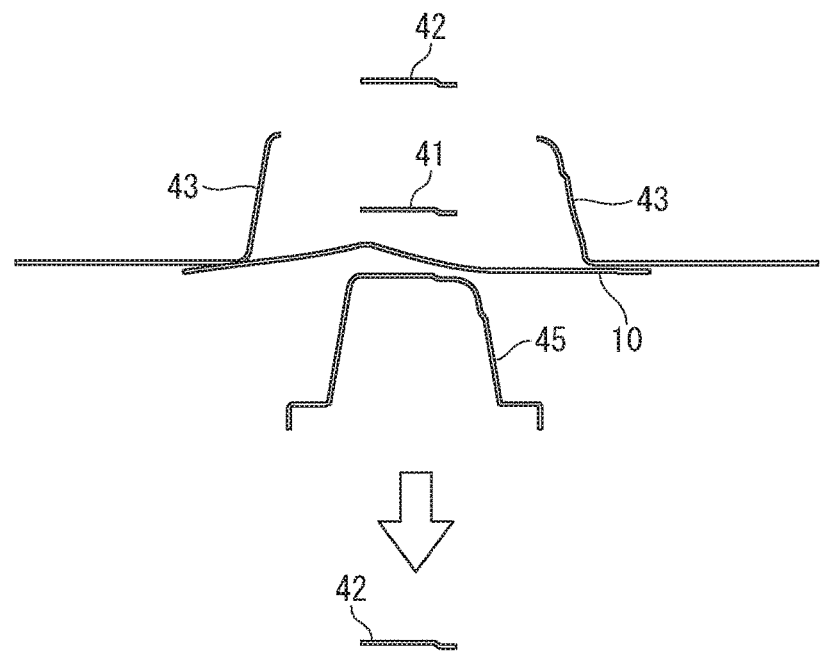
FIG. 8 is a diagram illustrating movement of the bending die in the main forming step.
Figure 8B:
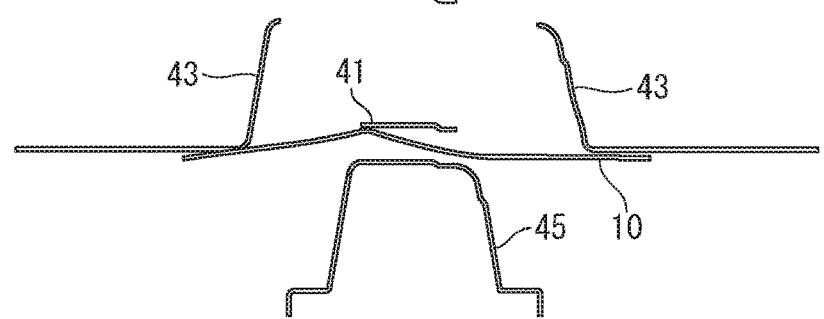
Figure 8C:
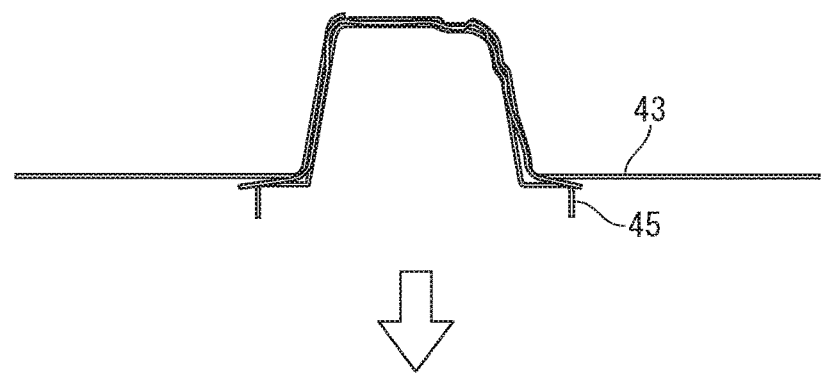
Figure 8D:
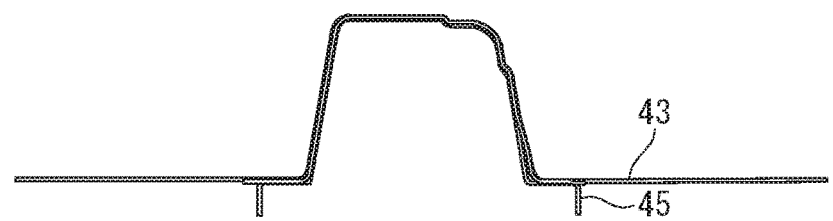

The metal sheet 10 with the projection portion 20 formed at the projection portion forming step is placed on the punch 45 (see FIG. 8A).

In this state, the upper die 40 descends. When the upper die 40 descends, first, the pad 41 and the punch 45 pinches a position 12 corresponding to the top sheet portion of the metal sheet 10 (see FIG. 8B). When the upper die 40 further descends, the bending blades 43 contact with the metal sheet 10 (see FIG. 8C) and bend ridge lines, and the metal sheet 10 is formed into the press-formed component shape 1 at a bottom dead center (see FIG. 8D).

Figure 9:
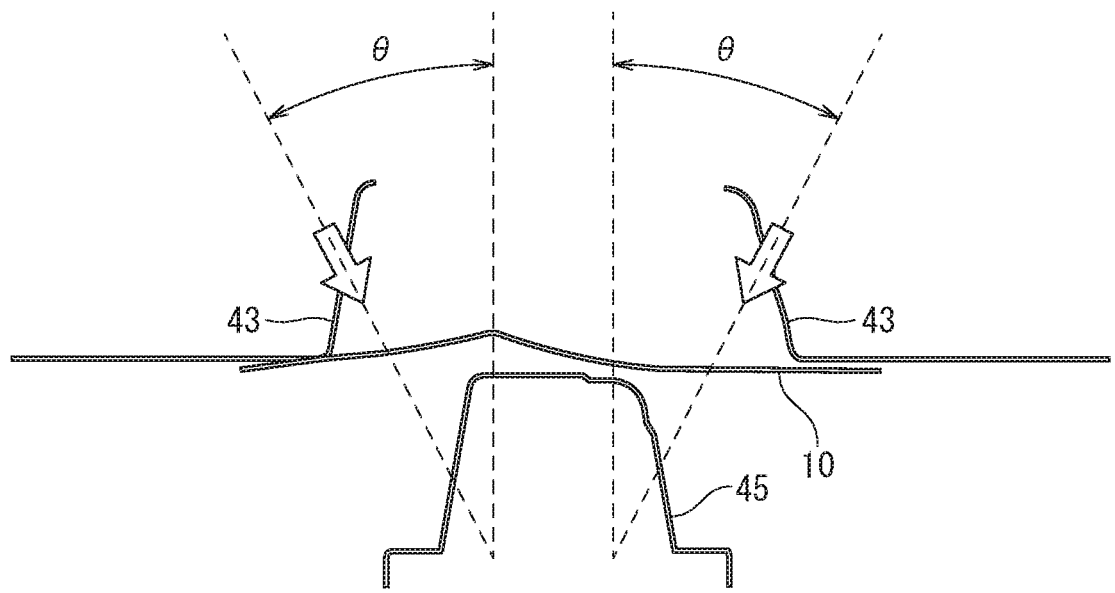
FIG. 9 is a diagram exemplifying by arrows an example of directions in which bending blades move during bending at the main forming step.

In this case, when a sheet thickness direction (a perpendicular direction) of the position 12 corresponding to the top sheet portion is assumed as a pressing direction, the bending blades 43 may include a known cam mechanism such that moves from a direction inclined by a certain angle θ with respect to the pressing direction toward the punch 45, as illustrated in FIG. 9.

Finally, the upper die 40 is raised and released to complete the forming.

Preferably, the angle θ is set to an angle inclined by 0 degrees to 90 degrees in directions away from the vertical wall portions 3 with respect to the pressing direction.

Movement of the material at the main forming step will be described with reference to FIG. 10.

In the sheet shape as in FIG. 4 obtained by rotationally displacing in-plane the position of the curved portion 10A in the developed shape, an angle formed by the right linear portion 10B and the left linear portion 10B is relatively larger than a final angle in the press-formed component shape 1 in a plan view due to the rotational displacement.

Thus, when the upper die 40 descends, and the bending blades 43 bends the ridge lines to perform bending of the vertical wall portions 3 and the flange portions 4 in the state where the position 12 corresponding to the top sheet portion is partially pinched by the pad 41 and the punch 45, the material is bent while the left linear portion 1B is being rotationally displaced by 2β with respect to the right linear portion 1B pinched by the pad 41b, as illustrated in FIG. 10. In other words, the curved portion 1A is formed while rotating around the position of the curved recessed side of the top sheet portion 2.

At this time, the material gathers to the top sheet portion 2 and the vertical wall portion 3 on the rotational center P side in the rotational displacement, and compressive deformation is applied. Considering this, embossed shapes are provided on the curved recessed side of the top sheet portion 12A in the metal sheet 10 to be subjected to main forming, as illustrated in FIG. 7. Providing embossed shapes 50 and 51 having unevenness on facing surfaces of the pad 41a and the punch 45 further improves formability.

Additionally, to facilitate the material at the position corresponding to the curved portion 1A as seen in a plan view to be rotationally displaced relatively with respect to the right linear portion 10B abutted with the pad 41b, the pad 41b that presses the linear portion 10B and the pad 41a that presses the curved portion 10A are structurally independent. In this case, to further facilitate the rotational displacement of the material at the position corresponding to the curved portion 10A, it is preferable to set a relationship between pressurization force of the pad 41a that presses the curved portion 10A and pressurization force of the pad 41b that presses the right linear portion 10B to the following relationship:

Pad pressurization force by pad 41a<pad pressurization force by pad 41b

The setting of the pressurization forces of the pad 41 described above may be made by adjusting an actual pressing force (a cushion force) applied by each of the pads 41a and 41b. In addition, the above-described setting of the pressurization forces of the pad 41 may be achieved by adjusting stroke of each pad to set such that a height of the pad 41a is relatively higher than a height of the pad 41b during bending.

Figure 11:
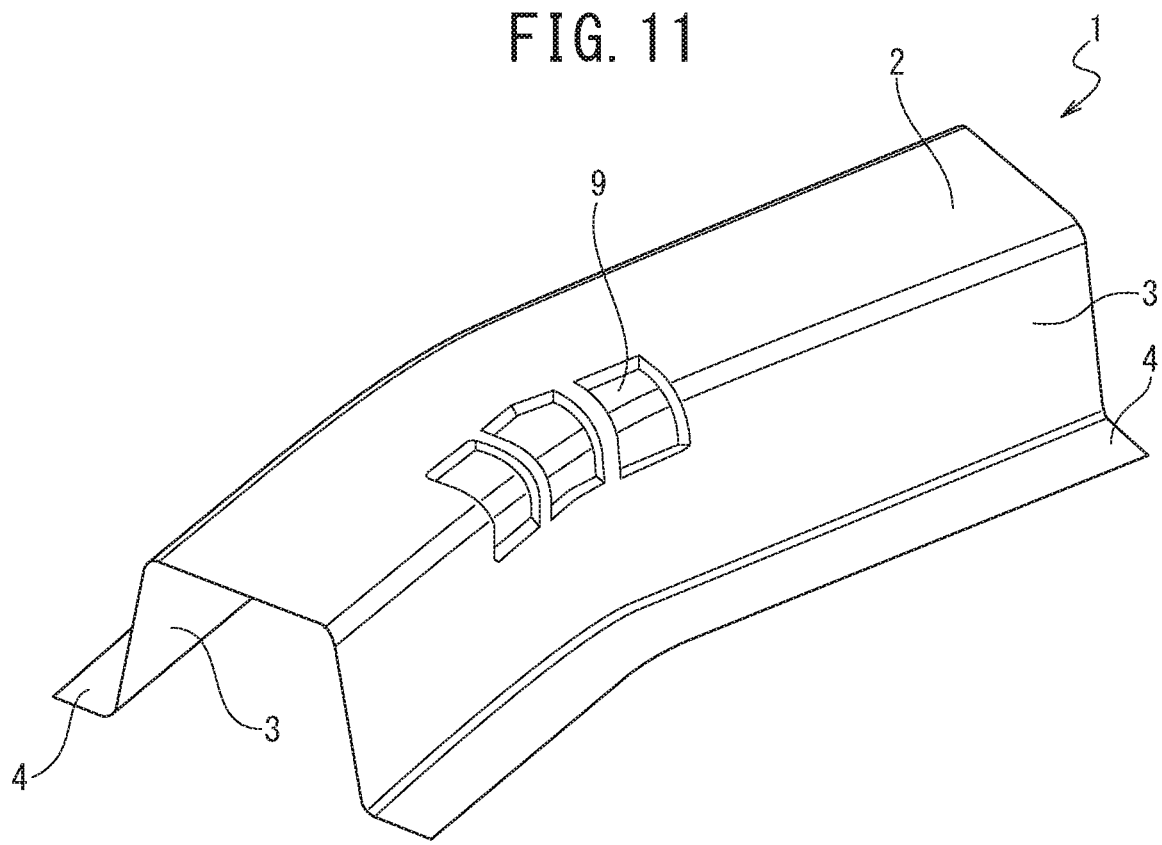
FIG. 11 is a perspective view illustrating one embodiment of the press-formed component shape formed by the main forming step.

FIG. 11 illustrates an example of the shape of a press-formed component after the main forming step. Reference sign 9 denotes a provided embossed shape.

(Regarding Effects and Others)

(1) The following sheet shape is employed for the metal sheet 10 for press forming that is press-formed into the press-formed component shape 1 that has the hat-shaped cross-sectional shape including the vertical wall portion 3 and the flange portion 4 on both sides of the widthwise direction of the top sheet portion 2 and that includes, at one or more places along the longitudinal direction, the curved portion 1A curved in such a manner as to protrude toward one side of the widthwise direction of the top sheet portion 2 in the plan view.

Specifically, the metal sheet 10 for press forming has a sheet shape obtained by modifying the developed shape of the press-formed component shape 1 simply developed on a plane in such a manner that, in the region 10A corresponding to the curved portion 1A, the line length of the position n3 corresponding to the ridge line m3 between the top sheet portion 2 and the vertical wall portion 3 in the press-formed component shape 1 is equal to the line length of the ridge line m3 into the shape such that, in the region 10A corresponding to the curved portion 1A, the boundary h2 between the region 10A corresponding to the curved portion 1A and the other region 10B is rotationally displaced in-plane around the rotational center P set at a position on the curved recessed side rather than the position q4 corresponding to the ridge line between the top sheet portion 2 and the vertical wall portion 3Ab on the curved recessed side, in the direction in which the line length of the position q1 that becomes the outer edge m1 of the flange portion 4Aa on the curved protruding side approaches the line length of the outer edge m1 of the flange portion 4Aa on the curved protruding side in the press-formed component shape.

With use of the above metal sheet 10, the line lengths of the flange portions 4 on the curved protruding side and the curved recessed side in the curved portion 1A approach the line lengths in the press-formed component. As a result, the press-formed component having a hat-shaped cross-sectional shape and including one or more curved portions 1A curved toward one side of the widthwise direction of the top sheet portion 2 in the plan view along the longitudinal direction can be press formed with further reduced forming defects such as cracks, wrinkles, and lowered dimensional accuracy.

(2) In this case, preferably, the difference between the line length of the position q1 that becomes the outer edge of the flange portion 4 on the curved protruding side in the modified developed shape and the line length of the outer edge m1 of the flange portion 4 on the curved protruding side in the press-formed component is set to equal to or less than 10% of the line length of the outer edge m1 of the flange portion 4 on the curved protruding side in the press-formed component shape.

This structure can further ensure that press forming is performed with further reduced forming defects such as cracks, wrinkles, and lowered dimensional accuracy.

(3) In the metal sheet 10, preferably, the projection portion 20 protruding in an out-of-plane direction is formed in the regions corresponding to the top sheet portion 2 and the vertical wall portion 3 on the curved protruding side in the region corresponding to the curved portion 1A. In this case, it is preferable that with the projection portion 20, the difference between the line length of the position q3 corresponding to the ridge line m3 between the top sheet portion 2 and the vertical wall portion 3 on the curved protruding side and the line length of the ridge line m3 between the top sheet portion 2 and the vertical wall portion 3 on the curved protruding side in the press-formed component shape is set to equal to or less than 10% of the line length of the ridge line m3 between the top sheet portion 2 and the vertical wall portion 3 on the curved protruding side in the press-formed component shape.

With this structure, the reduction in the line length of the position q3 corresponding to the ridge line m3 between the top sheet portion 2 and the vertical wall portion 3 on the curved protruding side due to the modification of the developed shape described above is eliminated, and the difference between the line lengths becomes small. As a result, it can be further ensured that press forming is performed with further reduced forming defects such as cracks, wrinkles, and lowered dimensional accuracy.

(4) Preferably, in the region of each linear portion 10B other than the region corresponding to the curved portion 10A includes, at least one ridge line position of the positions that become the ridge lines, the bead shape 21 or a crease shape extending in the direction along the ridge line is provided at least one place.

With this structure, when bending the metal sheet 10 having the above-described structure, it can be further ensured that bending at the ridge line positions can be performed, thereby enabling more accurate press forming.

(5) The present embodiment is significantly effective when the metal sheet 10 for press forming is made of a material having a tensile strength of 590 MPa or more.

(6) Forming of the projection portion 20 onto the metal sheet 10 for press forming may be performed by, for example, drawing or stamping.

Employing drawing or stamping can ensure formation of the projection portion 20.

(7) The press forming device for press forming the metal sheet 10 into the desired press-formed component shape 1 is configured to include the upper die 40 including the die 42, the pad, and the bending blades 43 and the lower die including the punch 45 facing the pad in the pressing direction, in which the pad 41 is divided into the pad 41a that pressurizes the region corresponding to the curved portion 1A in the top sheet portion 2 and the pad 41b that pressurizes the region of the linear portions 1B other than the curved portion 1A in the top sheet portion 2, and in which the bending blades 43 are configured to perform bending of the vertical wall portions 3 and the flange portions 4. It is preferable to set such that when, in the bending, the pressurization force applied to the top sheet portion 2 by the pad 41a is P1 and the pressurization force applied to the top sheet portion 2 by the pad 41b is P2, P1<P2 holds.

With this structure, restraint of the curved portion 1A by the pad 41 is set relatively weak, as a result of which the material at the position of the curved portion 10A is relatively easily moved. This can further ensure that the metal sheet 10 can be bent into the desired press-formed component shape 1 while allowing the rotational displacement at the position of the curved portion 10A.

(8) In the press forming device of the present embodiment, when the sheet thickness direction of the top sheet portion 2 is set as a pressing direction, it is preferable to set such that at least one of the bending blades 43 moves at an angle of from 0 degrees to 90 degrees with respect to the pressing direction, and preferably at an angle of from 0 degrees to 45 degrees with respect to the pressing direction to perform bending of the vertical wall portion 3 and the flange portion 4. More preferred is an angle of from 5 degrees to 40 degrees.

(9) In the press forming device, preferably, the pad 41a is formed with the embossed shape 50 on a surface abutting the region of the curved recessed side in the top sheet portion 2, and the embossed shape 51 also is formed at a position facing an embossed shape-formed region in the punch 45.

(10) In the method for producing a press-formed component of the present embodiment, after the metal sheet 10 is placed on the punch 45, the upper die 40 is caused to descend to bring the upper die 40 close to the lower die 44, then the position of the top sheet portion 2 is pinched by the pad 41 of the upper die 40 and the punch 45, and the upper die 40 is caused to further descend. By doing this, the vertical wall portions 3 and the flange portions 4 are bent by the bending blades 43 of the upper die 40. Regarding the pressurization force applied to the top sheet portion 12 by the pad 41 during bending, the pressurization force at the linear portions 10B other than the curved portion 10A is set to be relatively larger than the pressurization force at the position of the curved portion 1A.

With this structure, the press-formed component having the hat-shaped cross-sectional shape and including one or more curved portions 1A curved toward one side of the widthwise direction of the top sheet portion 2 in the plan view along the longitudinal direction can be press formed with further reduced forming defects such as cracks, wrinkles, and lowered dimensional accuracy.

As above, according to the present embodiment, the press-formed component shape 1 including the top sheet portion 2 and the vertical wall portions 3 and the flange portions 4 continuous thereto and including at least one shape curved in the longitudinal direction as seen in a plan view can be formed without any cracks and wrinkles, and furthermore, spring-back due to stress difference in the longitudinal direction between the top sheet portion 2 and the flange portions 4 can be suppressed.

EXAMPLES

Next, Examples based on the present invention will be described.

Assuming a cold-rolled steel sheet having a tensile strength of 1180 MPa (sheet thickness: 1.4 mm), press forming analysis of a press-formed component having the press-formed component shape 1 as illustrated in FIG. 1 was performed. In the present Example, shape parameters in the curved portion 1A that define the press-formed component shape 1 were set as follows:

<Cross-Sectional Shape Parameters>
Top sheet portion 2's width W: 100 mm
Vertical wall height H: 100 mmm
Vertical wall angle θ: 10 deg
Flange length f: 30 mm
<Bending Parameters in Plan View>
Bending angle α: 80 deg
Top sheet portion 2's perimeter radius R: 500 mm In designing the shape of the metal sheet 10 for use in the above press-formed component shape 1, a center position of the position n2 corresponding to the outer edge m2 of the flange portion 4Ab on the curved recessed side was set as the rotational center P in the developed shape simply developed as in FIG. 3, and the angle 2β for rotating around the angle of the flange portion 14Ab on the curved recessed side was calculated by the above-mentioned expression.

Figure 12:
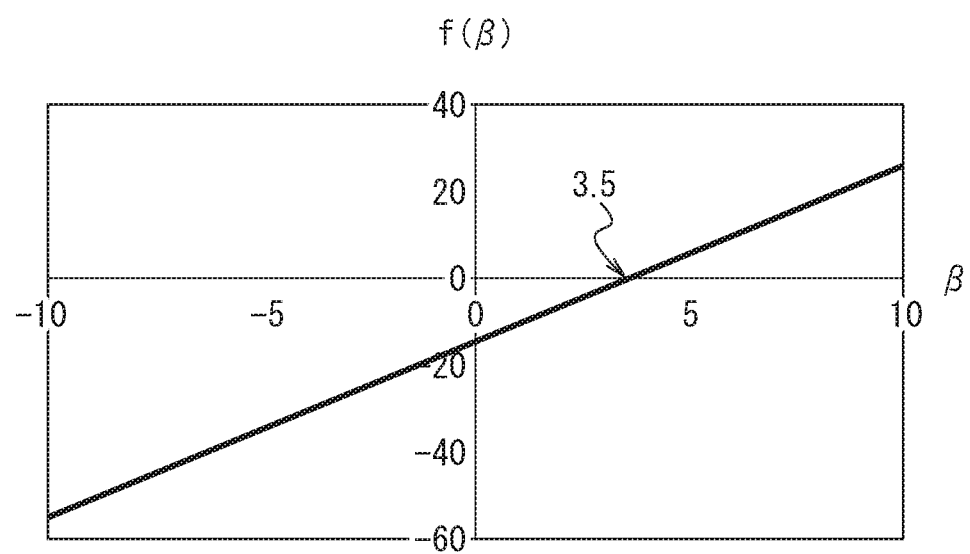
FIG. 12 is a diagram illustrating a relationship between β and design variables according to the present invention method in Example, in which the lateral axis represents β and the vertical axis represents f(β)

FIG. 12 illustrates a relationship between β and calculated value f(β) when β changes. FIG. 12 depicts a case where β is plotted on the lateral axis and function values of the f(β) are plotted on the vertical axis.

Figure 13:
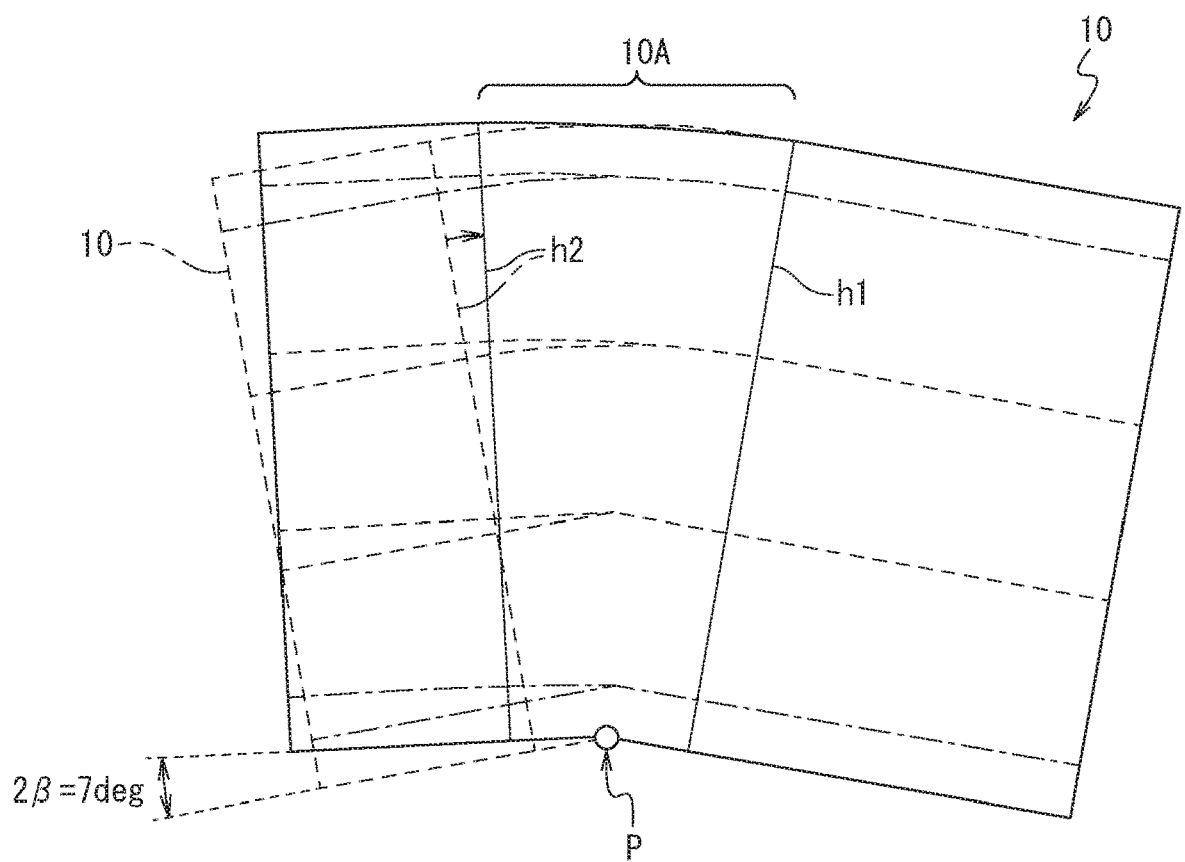
FIG. 13 illustrates a metal sheet designed on the basis of the present invention in Example.

In FIG. 12, 2β when f(β)=0 in rotational displacement is an optimum rotational angle. Then, in the present Example, when β=3.5, f(β)=0. Therefore, the rotational angle 2β is 7 deg. FIG. 13 illustrates a shape of the metal sheet 10 rotationally displaced on the basis of the present invention with respect to the simply-developed developed shape.

Additionally, in the present Example, the projection portion 20 was formed on the metal sheet 10 at the projection portion forming step.

First, the line length ΔL was calculated that was required to be secured at the ridge line m3 of the top sheet portion 2 on the curved protruding side. The parameters of the press-formed component shape 1 and the value of β previously calculated were substituted in the above-mentioned expression to result in ΔL=13 mm.

The design method as described above was employed to design the shape of the metal sheet 10 of the present Example, as illustrated in FIG. 13, and a stretch forming die for use in the projection portion forming step.

Furthermore, in the present Example, to stably perform forming at the main forming step, the metal sheet 10 was provided with the bead shape 21 having a height of 3 mm and a width of 5 mm at positions corresponding to ridge lines on both sides of the widthwise direction adjacent to the top sheet portion 12 in the linear portions 10B. At the projection portion forming step, a blank holding force of 50 ton was set, and the upper die was brought down to a bottom dead center to perform an analysis for forming the metal sheet 10 including the projection portion 20.

Next, with use of the bending die illustrated in FIG. 7, analysis was made for the main forming step of forming the metal sheet 10 including the projection portion 20 into the desired press-formed component 1. At the main forming step, the bending blades 43 bending formation positions of the ridge lines moved at an angle inclined by 30 degrees with respect to the pressing direction, and formed using the cam mechanism for bending the vertical wall portion 3 and the flange portions 4.

Additionally, as pads for pinching the top sheet portion 12, pads 41a and 41b divided into two were used to independently press the curved portion 1A and the region of one of the left and right linear portions 1B other than that in the top sheet portion 12. In this case, the amounts of stroke and pressure of the pad 41a were 100 mm and 2 ton, and the stroke and pressure of the pad 41*b* were 125 mm and 10 ton. Note that heights of the pads 41*a* and 41*b* at initial positions were made equal.

Figure 14:
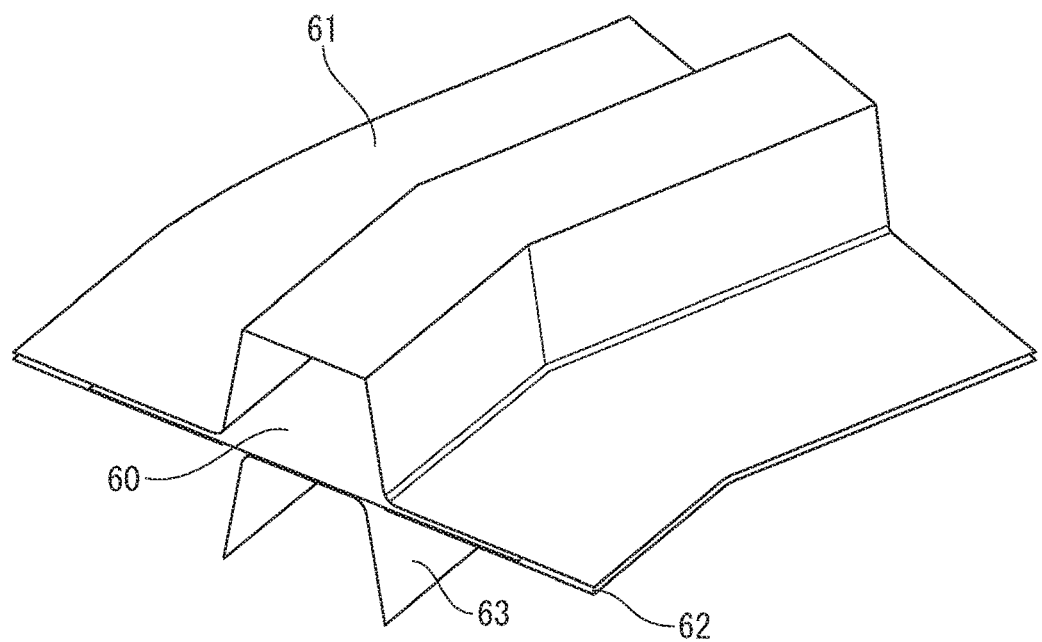
FIG. 14 is a diagram illustrating the structure of a conventional drawing die in Example.

In addition, as Comparative Example relative to Example of the present invention, an analysis using drawing that has been conventionally performed was also performed together. FIG. 14 illustrates a die used in the drawing. The drawing die includes an upper die formed by a die 61 and a lower die formed by a punch 63 and a blank holder 62 that presses the flange portions 4. The blank holding force was set to 50 ton.

Furthermore, Comparative Example used, as a shape of a metal sheet 60 for press forming, a sheet having the developed shape obtained by simply developing the press-formed component shape 1 (see FIG. 3).

FIG. 15 illustrates a sheet thickness reduction rate distribution at a forming bottom dead center when forming into the desired press-formed component shape 1 was performed by the conventional method. Additionally, FIG. 16 illustrates a sheet thickness reduction rate distribution at a forming bottom dead center when forming into the desired press-formed component shape 1 was performed on the basis of the present invention.

In the press-formed component formed by the conventional drawing, since the flange portions 4 were pinched by the die 42 and the blank holder, it was possible to form without any increase in the sheet thickness on the flange portion 4 of the outer side curved in the longitudinal direction.

In addition, although the press-formed component formed by the method based on the present invention was produced by forming the metal sheet 10 by bending, almost no increase in the sheet thickness was seen on the flange portion 4 on the curved protruding side.

However, at the flange portion 4 on the curved recessed side formed by the conventional drawing, tensile deformation was applied at a flange end due to material shortage, so that sheet thickness reduction was seen.

On the other hand, at the flange on the curved recessed side in the method based on the present invention, the material was supplied by rotation of the material, so that almost no tensile deformation was applied, and thus there was no sheet thickness reduction.

Figure 17A:
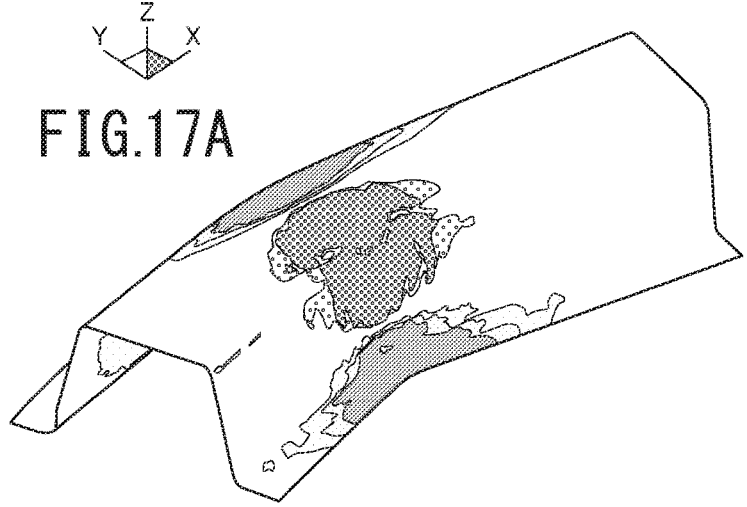
FIG. 17 is a diagram illustrating an axial force distribution in a longitudinal direction at the bottom dead center when formed by the conventional drawing in Example.
Figure 17B:
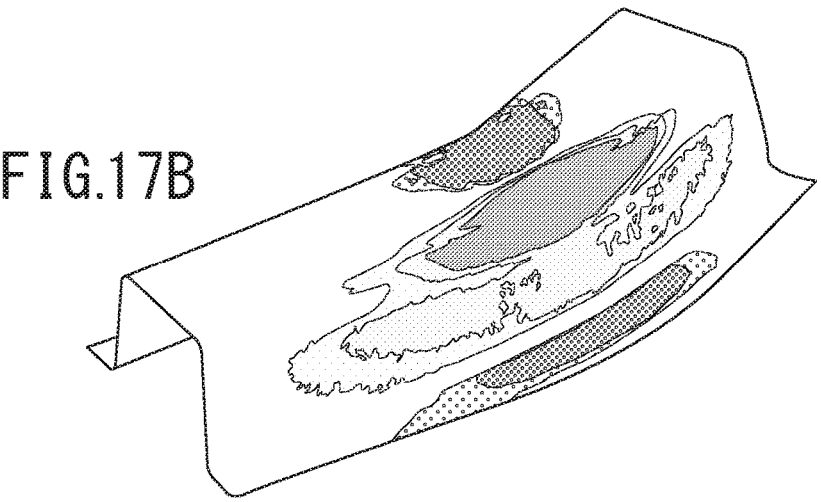
Figure 18A:
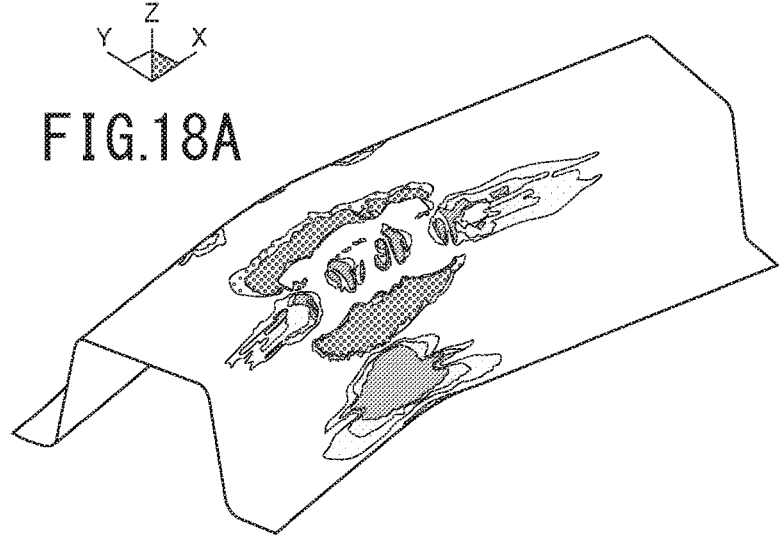
FIG. 18 is a diagram illustrating an axial force distribution in a longitudinal direction at the bottom dead center when formed on the basis of the present invention in Example.
Figure 18B:
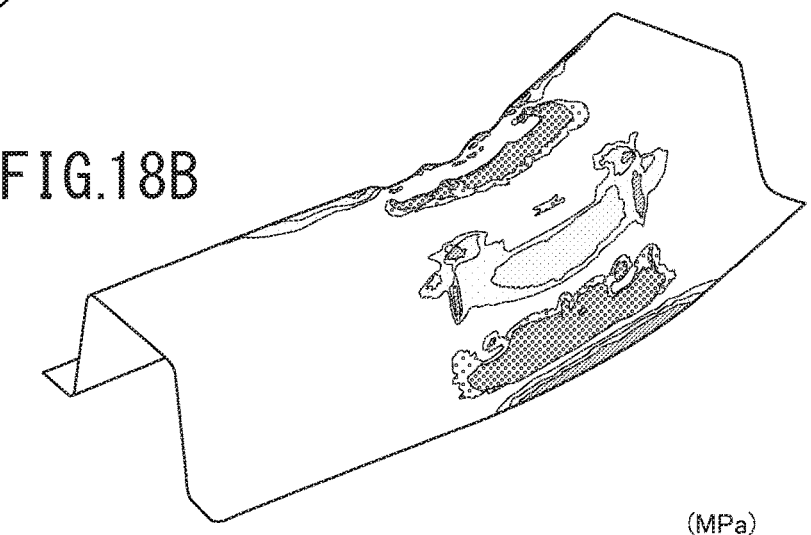

FIG. 17 illustrates a stress distribution (a longitudinal axial force distribution) at a sheet thickness center in the longitudinal direction (x direction) at the forming bottom dead center when the sheet was formed into the press-formed component shape 1 by the conventional method. Additionally, FIG. 18 illustrates a stress distribution (a longitudinal axial force distribution) at a sheet thickness center in the longitudinal direction (x direction) at the forming bottom dead center when the sheet was formed into the press-formed component shape 1 by the method based on the present invention.

In addition, FIG. 19 illustrates a distribution of sheet thickness front-back stress difference in a cross-sectional direction (a direction along the cross section) at the forming bottom dead center when forming into the press-formed component shape 1 was performed by the conventional method. FIG. 20 illustrates a distribution of sheet thickness front-back stress difference in the cross-sectional direction (the direction along the cross section) at the forming bottom dead center when forming into the press-formed component shape 1 was performed by the method based on the present invention.

In the press-formed component formed by the conventional drawing, tensile stress was applied to the top sheet portion 2 on the curved protruding side, and compressive stress to the flange portion 4 thereon, whereas compressive stress was applied to the top sheet portion 2 on the curved recessed side, and tensile stress to the flange portion 4 thereon. In this case, a stress difference occurring between the top sheet portion 2 and the flange portions 4 becomes a source that generates a spring-back moment that causes three-dimensional distortion of the press-formed component.

On the other hand, in the method based on the present invention, tensile deformation was applied to the flange on the curved protruding side, and compressive stress was reduced. Furthermore, on the contrary, the material gathered to the flange portion 4 on the curved recessed side, so that tensile deformation was reduced. In addition, since stretch forming was performed on the top sheet portion 2 on the curved protruding side at the projection portion forming step to compensate for the expected shortage of the material in advance, whereby tensile stress was reduced. At the top sheet portion 2 on the curved recessed side, the material gathers, and compressive stress is applied. Thus, the bead shape 21 was provided as in the present Example to suppress the occurrence of compressive stress.

Next, when looking at the front-back stress difference distribution in the sheet thickness direction of the cross-sectional direction of the component formed by the conventional drawing, a large sheet thickness front-back stress difference was seen on the vertical wall portions 3 of the component. The front-back stress difference of the vertical wall portions 3 becomes a stress that causes the vertical wall portions 3 to spring back so as to warp.

On the other hand, when checking the distribution of sheet thickness front-back stress difference in the widthwise direction of the component formed by the method based on the present invention, it can be seen that the front-back stress difference distribution in the sheet thickness direction of the vertical wall portions 3 seen in the conventional method has hardly occurred. This is due to the fact that because of the bending-oriented forming performed at the main forming step, the material has not been subjected to bending-unbending deformation that generates a stress that causes the occurrence of vertical wall warp.

Figure 21A:
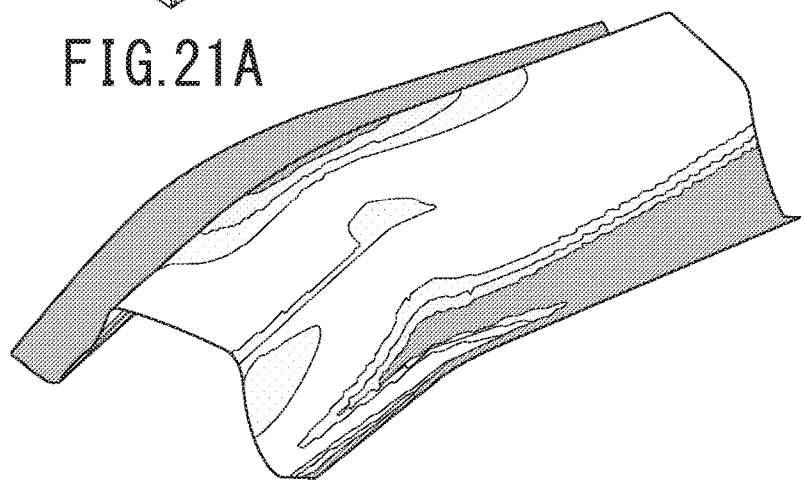
FIG. 21 is a diagram illustrating a distribution of deviation amounts from a press-formed component shape after release when formed by the conventional drawing in Example.
Figure 21B:
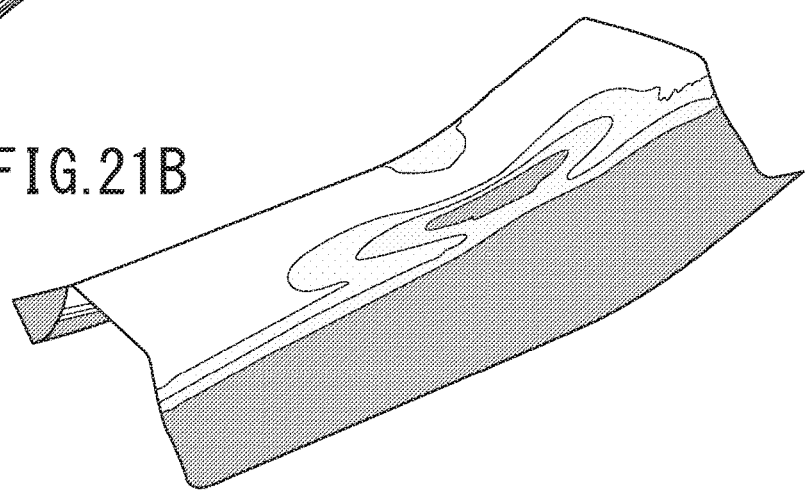
Figure 22A:
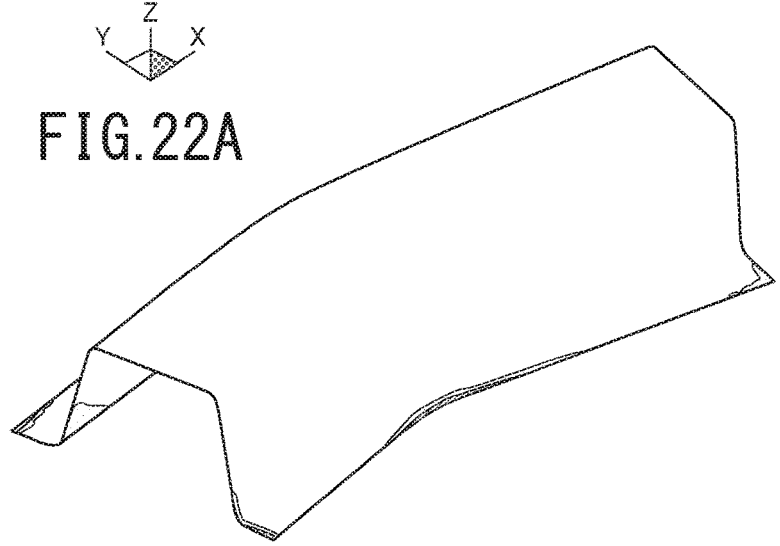
FIG. 22 is a diagram illustrating a distribution of deviation amounts from a press-formed component shape after release when formed on the basis of the present invention in Example.
Figure 22B:
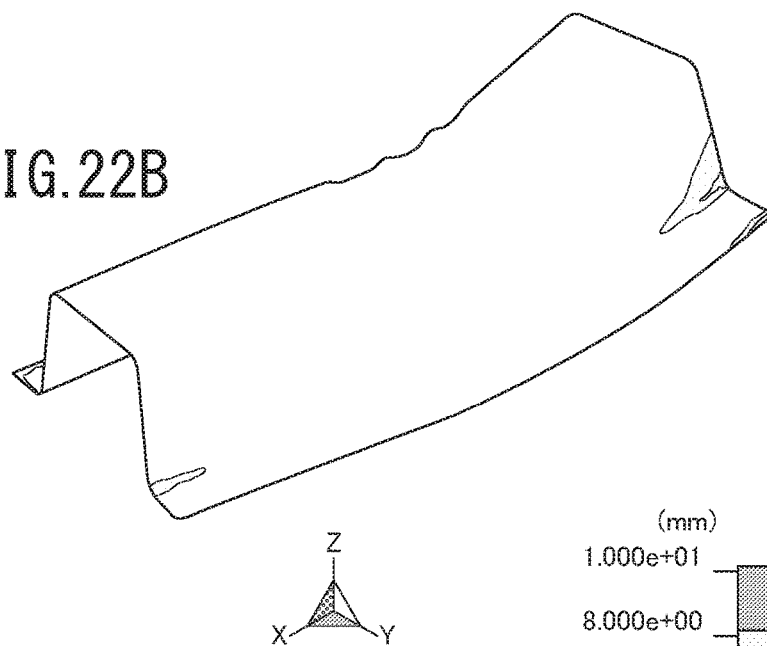

Next, FIG. 21 illustrates a distribution of deviation amounts from a normal shape after spring-back in the press-formed component shape 1 formed by the conventional method. FIG. 22 illustrates a distribution of deviation amounts from a normal shape after spring-back in the press-formed component shape 1 formed by the method based on the present invention.

As described above, in the conventional method, there was a difference in the sheet thickness center stress in the longitudinal direction (x direction) between the top sheet portion 2 and the flange portions 4 of the curved portion 1A in the longitudinal direction, whereby three-dimensional spring-back occurred, and distortion was observable. Additionally, at the vertical wall portions 3 as well, the spring-back moment that causes the occurrence of warp caused large warping of the vertical wall portions 3, whereby the cross section was significantly deviated in an opening direction.

On the other hand, the forming method based on the present invention is a forming method that reduces the sheet thickness center stress in the longitudinal direction (x direction) and the sheet thickness front-back stress difference in the widthwise direction that cause the above-mentioned spring-back. Thus, the forming method has enabled significant suppression of the spring-back, as compared with the conventional drawing method.

Herein, this application claims the benefit of priority of Japanese Patent Application No. 2018-034569 (filled on Feb. 28, 2018), the entirety of which is hereby incorporated by reference. Herein, although the above description has been made with reference to the limited number of embodiments, the scope of the present invention is not limited thereto, and modifications of the respective embodiments based on the above disclosure are obvious to those skilled in the art.

REFERENCE SIGNS LIST

1: Press-formed component shape
1A: Curved portion
1B: Linear portion
2, 2A: Top sheet portion
3, 3A*a*, 3A*b*: Vertical wall portion
4, 4A*a*, 4A*b*: Flange portion
10: Metal sheet
10A: Curved portion
10B: Linear portion
12, 12A: Top sheet portion
13Aa: Vertical wall portion
14Aa, 14A*b*: Flange portion
20: Projection portion
21: Bead shape
30: Die
30A: Recessed portion
31: Punch
40: Upper die
41: Pad
41*a*: Pad (first pad)
41*b*: Pad (second pad)
42: Die
43: Bending blade
44: Lower die
45: Punch
50, 51: Embossed shape
h1, h2: Boundary
2α: Angle

The invention claimed is:

1. A metal sheet for press forming to be press formed into a press-formed component shape that has a hat-shaped cross-sectional shape including a vertical wall portion and a flange portion on both sides of a widthwise direction of a top sheet portion and that includes, at one or more places along a longitudinal direction of the top sheet portion, a curved portion curved in such a manner as to protrude toward one side of the widthwise direction of the top sheet portion as seen in a plan view,
wherein, in a developed shape of the press-formed component shape developed on a plane in such a manner that a line length of a position corresponding to a line length of a ridge line between the top sheet portion and the vertical wall portion in the press-formed component shape is equal to a line length of a position corresponding to the ridge line in a region corresponding to the curved portion, a boundary between the region corresponding to the curved portion of the developed shape and an other region is rotationally displaced in-plane around a rotational center set at a position on a curved recessed side rather than a position corresponding to a ridge line between the top sheet portion and the vertical wall portion on the curved recessed side, in a direction in which a line length of an outer edge of a position to be formed into the flange portion on a curved protruding side in the developed shape approaches a line length of an outer edge of the flange portion on the curved protruding side in the press-formed component shape.

2. The metal sheet for press forming according to claim 1, wherein a difference between the line length of the outer edge of the position to be formed into the flange portion on the curved protruding side in the metal sheet having the rotationally displaced shape and the line length of the outer edge of the flange portion on the curved protruding side in the press-formed component shape is set to equal to or less than 10% of the line length of the outer edge of the flange portion on the curved protruding side in the press-formed component shape.

3. The metal sheet for press forming according to claim 1, comprising a projection portion protruding in an out-of-plane direction in regions corresponding to the top sheet portion and the vertical wall portion on the curved protruding side in the region corresponding to the curved portion, wherein with the projection portion, a difference between a line length of a position corresponding to a ridge line between the top sheet portion and the vertical wall portion on the curved protruding side in the metal sheet having the rotationally displaced shape and a line length of a ridge line between the top sheet portion and the vertical wall portion on the curved protruding side in the press-formed component shape is set to equal to or less than 10% of the line length of the ridge line between the top sheet portion and the vertical wall portion on the curved protruding side in the press-formed component shape.

4. The metal sheet for press forming according to claim 1, wherein, in a region of a linear portion other than the region corresponding to the curved portion, at least one position of positions corresponding to ridge lines between the top sheet portion and the vertical wall portions and positions corresponding to ridge lines between the vertical wall portions and the flange portions, there is provided at least one bead shape or crease shape extending in a direction along the corresponding ridge line.

5. The metal sheet for press forming according to claim 1, the metal sheet being made of a material having a tensile strength of 590 MPa or more.

6. A press forming device configured to press form the metal sheet according to claim 1 into a press-formed component shape that has a hat-shaped cross-sectional shape including a vertical wall portion and a flange portion on both side of a widthwise direction of a top sheet portion and that includes, at one or more places along a longitudinal direction of the top sheet portion, a curved portion curved in such a manner as to protrude toward one side of the widthwise direction of the top sheet portion in a plan view, the press forming device comprising an upper die including a die, a pad, and bending blades and a lower die including a punch facing the pad in a pressing direction, wherein the pad is divided into a first pad configured to pressurize the region corresponding to the curved portion in the top sheet portion and a second pad configured to pressurize a region of a linear portion other than the curved portion in the top sheet portion, and wherein the bending blades are configured to be capable of bending the vertical wall portions and the flange portions.

7. The press forming device according to claim 6, wherein when, in the bending, a pressurization force applied to the top sheet portion by the first pad is P1 and a pressurization force applied to the top sheet portion by the second pad is P2, P1<P2 holds.

8. The press forming device according to claim 6, wherein when a sheet thickness direction of the top sheet portion is set as a pressing direction, at least one of the bending blades is configured to move at an angle of from 0 degrees to 90 degrees with respect to the pressing direction to perform bending of the vertical wall portion and the flange portion.

9. The press forming device according to claim 6, wherein the first pad and a portion of the punch facing the first pad are formed with an embossed shape on surfaces that abut a region on the curved recessed side of the top sheet portion of the curved portion.

10. A method for producing a press-formed component comprising: placing the metal sheet according to claim 1 on a punch;
then causing an upper die to descend toward a lower die to pinch a position of a top sheet portion by a pad of the upper die and the punch; and causing the upper die to further descend to perform bending of vertical wall portions and flange portions by bending blades of the upper die, wherein the press-formed component is produced by making a pressurization force applied to the top sheet portion by the pad at a linear portion position other than the curved portion relatively larger than the pressurization force at a curved portion position to perform the bending.

11. The metal sheet for press forming according to claim 2, wherein, in a region of a linear portion other than the region corresponding to the curved portion, at least one position of positions corresponding to ridge lines between the top sheet portion and the vertical wall portions and positions corresponding to ridge lines between the vertical wall portions and the flange portions, there is provided at least one bead shape or crease shape extending in a direction along the corresponding ridge line.

12. The metal sheet for press forming according to claim 3, wherein, in a region of a linear portion other than the region corresponding to the curved portion, at least one position of positions corresponding to ridge lines between the top sheet portion and the vertical wall portions and positions corresponding to ridge lines between the vertical wall portions and the flange portions, there is provided at least one bead shape or crease shape extending in a direction along the corresponding ridge line.

13. The metal sheet for press forming according to claim 2, the metal sheet being made of a material having a tensile strength of 590 MPa or more.

14. The metal sheet for press forming according to claim 3, the metal sheet being made of a material having a tensile strength of 590 MPa or more.

15. The metal sheet for press forming according to claim 4, the metal sheet being made of a material having a tensile strength of 590 MPa or more.

16. A press forming device configured to press form the metal sheet according to claim 2 into a press-formed component shape that has a hat-shaped cross-sectional shape including a vertical wall portion and a flange portion on both side of a widthwise direction of a top sheet portion and that includes, at one or more places along a longitudinal direction of the top sheet portion, a curved portion curved in such a manner as to protrude toward one side of the widthwise direction of the top sheet portion in a plan view, the press forming device comprising an upper die including a die, a pad, and bending blades and a lower die including a punch facing the pad in a pressing direction, wherein the pad is divided into a first pad configured to pressurize the region corresponding to the curved portion in the top sheet portion and a second pad configured to pressurize a region of a linear portion other than the cured portion in the top sheet portion, and wherein the bending blades are configured to be capable of bending the vertical wall portions and the flange portions.

17. A press forming device configured to press form the metal sheet according to claim 3 into a press-formed component shape that has a hat-shaped cross-sectional shape including a vertical wall portion and a flange portion on both side of a widthwise direction of a top sheet portion and that includes, at one or more places along a longitudinal direction of the top sheet portion, a curved portion curved in such a manner as to protrude toward one side of the widthwise direction of the top sheet portion in a plan view, the press forming device comprising an upper die including a die, a pad, and bending blades and a lower die including a punch facing the pad in a pressing direction, wherein the pad is divided into a first pad configured to pressurize the region corresponding to the curved portion in the top sheet portion and a second pad configured to pressurize a region of a linear portion other than the cured portion in the top sheet portion, and wherein the bending blades are configured to be capable of bending the vertical wall portions and the flange portions.

18. A press forming device configured to press form the metal sheet according to claim 4 into a press-formed component shape that has a hat-shaped cross-sectional shape including a vertical wall portion and a flange portion on both side of a widthwise direction of a top sheet portion and that includes, at one or more places along a longitudinal direction of the top sheet portion, a curved portion curved in such a manner as to protrude toward one side of the widthwise direction of the top sheet portion in a plan view, the press forming device comprising an upper die including a die, a pad, and bending blades and a lower die including a punch facing the pad in a pressing direction, wherein the pad is divided into a first pad configured to pressurize the region corresponding to the curved portion in the top sheet portion and a second pad configured to pressurize a region of a linear portion other than the cured portion in the top sheet portion, and wherein the bending blades are configured to be capable of bending the vertical wall portions and the flange portions.

19. A press forming device configured to press form the metal sheet according to claim 5 into a press-formed component shape that has a hat-shaped cross-sectional shape including a vertical wall portion and a flange portion on both side of a widthwise direction of a top sheet portion and that includes, at one or more places along a longitudinal direction of the top sheet portion, a curved portion curved in such a manner as to protrude toward one side of the widthwise direction of the top sheet portion in a plan view, the press forming device comprising an upper die including a die, a pad, and bending blades and a lower die including a punch facing the pad in a pressing direction, wherein the pad is divided into a first pad configured to pressurize the region corresponding to the curved portion in the top sheet portion and a second pad configured to pressurize a region of a linear portion other than the cured portion in the top sheet portion, and wherein the bending blades are configured to be capable of bending the vertical wall portions and the flange portions.

20. A method for producing a press-formed component comprising:
placing the metal sheet according to claim 2 on a punch;
then causing an upper die to descend toward a lower die to pinch a position of a top sheet portion by a pad of the upper die and the punch; and causing the upper die to further descend to perform bending of vertical wall portions and flange portions by bending blades of the upper die, wherein the press-formed component is produced by making a pressurization force applied to the top sheet portion by the pad at a linear portion position other than the curved portion relatively larger than the pressurization force at a curved portion position to perform the bending.

\* \* \* \* \*